United States Patent [19]
Zaidan

[11] Patent Number: 5,494,447
[45] Date of Patent: Feb. 27, 1996

[54] HINGE ASSEMBLY FOR ELECTRONIC DEVICES

[76] Inventor: Khalil S. Zaidan, P.O. Box 80022, Portland, Oreg. 97280

[21] Appl. No.: 408,121

[22] Filed: Mar. 21, 1995

Related U.S. Application Data

[63] Continuation of Ser. No. 38,680, Mar. 26, 1993, abandoned.

[51] Int. Cl.⁶ .................................................. H01R 39/00
[52] U.S. Cl. ................................ 439/31; 439/12; 16/361
[58] Field of Search ............................. 439/6, 10, 11–13, 439/18, 20, 24, 28, 31; 403/59–61; 16/361, 362, 364, 367

[56] References Cited

U.S. PATENT DOCUMENTS

| | | | |
|---|---|---|---|
| 1,241,030 | 9/1917 | Schade . | |
| 3,467,415 | 9/1969 | Sandor | 403/59 |
| 4,576,501 | 3/1986 | McConnell | 403/59 |
| 4,708,312 | 11/1987 | Rohr . | |
| 4,795,120 | 1/1989 | Kuzuya et al. . | |
| 4,852,032 | 7/1989 | Matsuda et al. . | |
| 4,980,676 | 12/1990 | Nomura et al. . | |
| 5,103,376 | 4/1992 | Blonder . | |
| 5,107,402 | 4/1992 | Malgouires . | |
| 5,165,644 | 11/1992 | Allen . | |
| 5,166,893 | 11/1992 | Hosoi . | |
| 5,168,423 | 12/1992 | Ohgami et al. . | |
| 5,267,123 | 11/1993 | Boothroyd et al. | 403/61 X |

OTHER PUBLICATIONS

AT&T Cord Detangler For Telephone Handset (photos and product packaging).
Advertisement of ZEOS Freestyle/SL Notebook from ZEOS International, Ltd.
Appendix B from ZEOS Freestyle/SL Notebook User's Guide Advertisement from GRiD Computer Systems.
Article from *Compute* Magazine Mar. 1993 "BCC AVANTI 486SLC" pp. 105–108.

*Primary Examiner*—Khiem Nguyen
*Attorney, Agent, or Firm*—Richard B. Klar

[57] ABSTRACT

A hinge assembly for interconnecting and stably supporting the parts of an electronic device while enhancing the three-dimensional adjustability of the position of the device's parts. The hinge assembly provides for lineal adjustment of each device part using a shaft secured to the part, a sleeve slidably attached to the shaft and a clamp controlling the resistance of the sleeve. The hinge assembly further provides joints for rotational adjustment of each device part about an axis parallel to the part's horizontal axis and about a rotational axis parallel to the part's latitudinal axis. Each axis is formed using a first element having a substantially cylindrical aperture and a second element having a substantially cylindrical end such that the cylindrical end is rotatably mounted in the cylindrical aperture. An electrical connector is included in each joint to pass electrical signals regardless of rotational position.

28 Claims, 13 Drawing Sheets

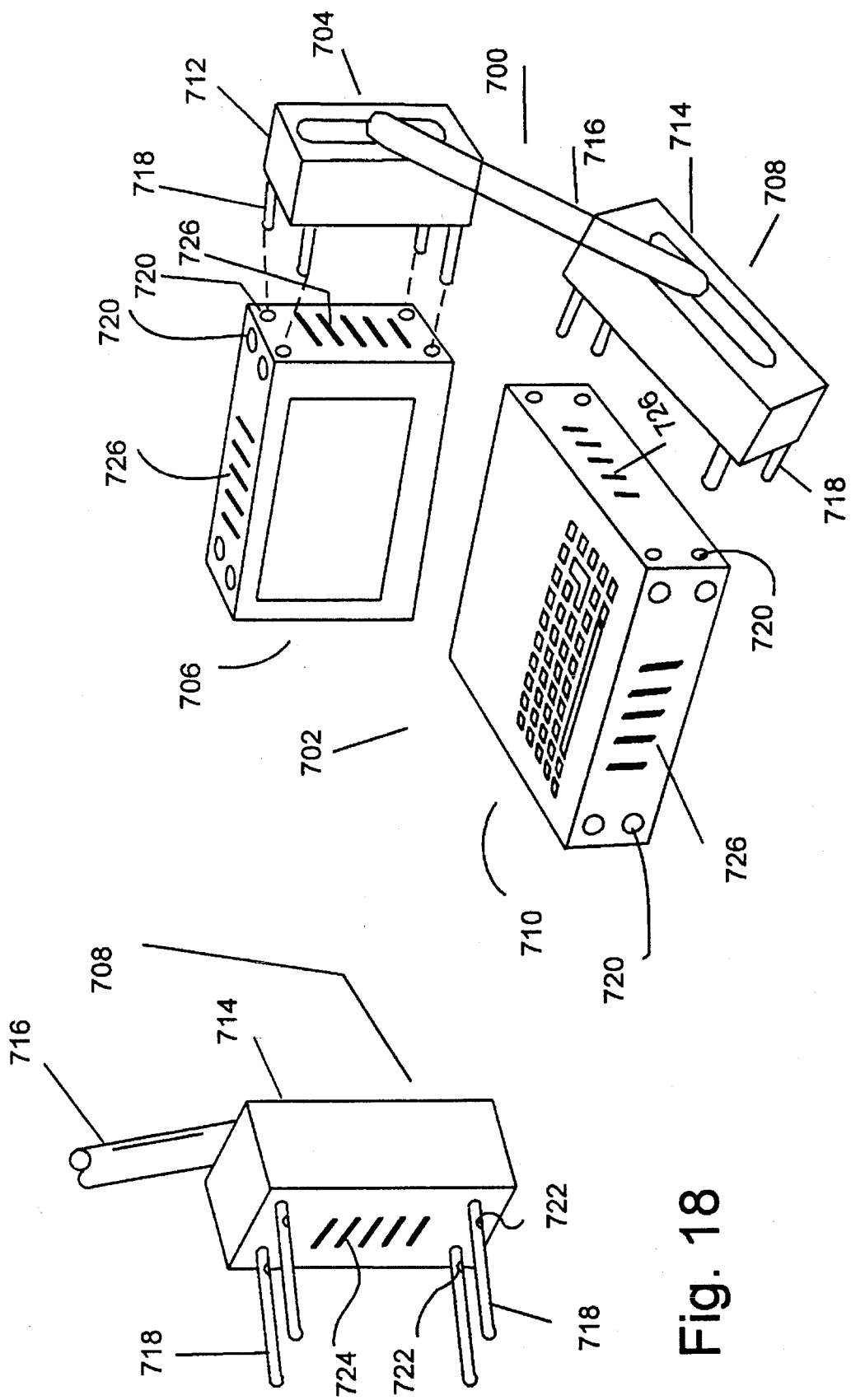

HINGE ASSEMBLY FOR ELECTRONIC DEVICES

This a continuation of application Ser. No. 08/038,680 filed on Mar. 26, 1993 now abandoned.

BACKGROUND OF THE INVENTION

This invention relates to hinges for electronic devices, particularly hinge assemblies for electronic devices having two or more device parts that interconnect and stably support the device parts while providing enhanced adjustability in the three-dimensional positioning of each device part relative to the other device parts, so as to enhance comfort, efficiency and effectiveness in using the electronic device.

Two-part electronic devices are common. They include personal computers of various categories such as desk-top, laptop, notebook, and palm-top computers, as well as pen-based tablet computers. Two-part electronic devices also include personal organizers and other electronic devices.

For two-part electronic devices, one device part typically is a video display. For example, portable computers typically have a flat panel display screen (the "display part"), e.g., an LCD or gas plasma display. The second device part typically is a base that holds, among other things, the bulk of the device's electronic hardware, such as disk drives (the "base part"). In portable computers, the base part also commonly holds a keyboard that may or may not be detachable from the base part. Broadly, the display and base parts can be described as typically being, in shape, rectangular prisms, having outside and inside surfaces and right, left, front and back sides.

In using two-part electronic devices, it is generally desirable to be able to adjust the relative positions of the two device parts through three dimensions substantially without restriction, while stably supporting both parts. For example, in portable computers the user may desire to adjust the vertical viewing angle of the display by rotating the display part horizontally relative to the base part. The user may desire to swivel the display part relative to the base part in order to allow a second person to view the display while not encumbering the user's access to the keyboard. The user may desire to position the display a shorter or longer distance from the user's eyes, with or without adjusting the viewing angle or the position of the keyboard. The user may desire to place the display part flat against the base part with the display exposed and the keyboard either (i) covered by the display part, for example, when input is to be pen-based, or (ii) uncovered by the display part, for example, when using the device's keyboard in conjunction with an external monitor rather than the integral display. Moreover, the user may desire to adjust the relative positions of the two device parts in these and other ways in sequence or in combination, depending on the type of electronic device and the nature of its use.

Hinge mechanisms that connect two-part electronic devices are known. They have a variety of forms, each having significant limitations, particularly by undesirably restricting the adjustability of one device part relative to the other device part. In one conventional form, the hinge mechanism is fixedly mounted to each of the device parts at or near respective sides of the parts. The hinge mechanism provides a single-axis about which both device parts rotate and does not allow translational movement of either part relative to the other. Examples of this conventional form of hinge mechanism are shown in Matsuda et al. U.S. Pat. No. 4,852,032 and Hosoi U.S. Pat. No. 5,166,893.

A second conventional form is shown in Blonder U.S. Pat. No. 5,103,376 ("Blonder") which discloses an interconnection mechanism between a keyboard portion and a display portion of a computer wherein the position of the keyboard and display portions can be reversed. The interconnection mechanism provides rotational capability about two axes, one disposed at respective back sides of the computer portions and the second disposed at respective front sides of the computer portions. However, Blonder's positioning adjustability is undesirably limited in that it allows neither translational movement of one portion relative to the other nor independent rotation about both axes. Blonder also fails to provide positioning adjustability about an axis perpendicular to either or both of the above-identified axes.

A third conventional form is shown in Malgouires U.S. Pat. No. 5,107,402 ("Malgouires") which discloses a portable terminal having a screen part and a central unit wherein the screen part is fixed to the central unit by at least one lever, the lever having at least two articulations, one disposed at the connection between the screen part and the lever and the other disposed at the connection between the lever and the central unit. The articulations provide off-set, parallel axes about which the screen part may be positionally adjusted relative to the central unit. Malgouires is subject to significant limitations in positioning adjustability in that it provides neither translational movement of either the screen part or the central unit relative to the other nor an axis perpendicular to the above-identified axes about which the screen part and central unit may be rotated relative to each other.

A fourth conventional form is shown in Ohgami et al. U.S. Pat. No. 5,168,423 ("Ohgami") which discloses a portable computer having a base unit and a flat panel display unit wherein the base unit has a turntable rotatably connected to the base unit in a horizontal direction. A display support, at one end, is fixed to the turntable and, at the other end, is pivotally connected to the flat panel display unit. Ohgami provides positioning adjustability of the flat panel display unit relative to the base unit about the vertical axis of the turntable and about the horizontal axis of the pivotal connection, said axes being perpendicular to each other. Ohgami fails to provide, however, translational movement of either unit relative to the other and does not permit one unit to be elevated relative to the other.

Because conventional hinge mechanisms for electronic device cases, such as in laptop, notebook and palm-top computers, have inherent shortcomings, a need exists for an improved hinge mechanism.

SUMMARY OF THE INVENTION

The present invention fulfills the need for an improved hinge mechanism for electronic devices, overcomes the shortcomings of prior art hinge mechanisms and provides certain advantages not heretofore available in such mechanisms, by providing a hinge assembly that interconnects and stably supports one device part relative to another while enhancing the three-dimensional adjustability of the position of each device part relative to one or more other device parts.

In a preferred embodiment used with an electronic device having display and base parts, the hinge assembly comprises a first shaft secured at its ends to a side of the display part, with its longitudinal axis parallel to the side of the display part. A first sleeve is slidably attached to the first shaft so that the position of the display part may be lineally adjusted by sliding the first shaft within the first sleeve. The first sleeve has a neck that extends away from the longitudinal axis of the first shaft and is rotatably attached to a first segment of a knuckle, the first segment having an axis about which the display part may be adjustably rotated. The knuckle has a second segment having an axis disposed substantially at a right angle to the axis of the first segment. The second segment of the knuckle is rotatably attached to one end of an arm so that the display part may be adjustably rotated about the axis of the second segment.

The hinge assembly further comprises a second shaft secured at its ends to a side of the base part, with its longitudinal axis parallel to the side of the base part. A second sleeve is slidably attached to the second shaft so that the position of the base part may be lineally adjusted by sliding the second shaft within the second sleeve. The second sleeve has a neck that extends away from the longitudinal axis of the second shaft and is rotatably attached to the second end of the arm. The second end of the arm has an axis about which the base part may be adjustably rotated. The second end's axis is substantially perpendicular to the longitude of the arm.

The base and display parts are interconnected by the arm disposed between the neck associated with the base part and the second segment associated with the display part. So interconnected, the base part-may be adjustably rotated about the axis of the display part's second segment. Moreover, in this manner, the hinge assembly provides interconnection, stable support and enhanced adjustability of the two parts relative to each other.

The hinge assembly can be used to interconnect, support and adjust positions of parts in electronic devices having more than two parts. In such devices, each added device part is interconnected to the adjacent device part using a shaft, sleeve and knuckle, or equivalent, and an arm, wherein the second segment of the added part's knuckle is rotationally attached to one end of the arm and the second end of the arm is rotationally attached to the neck of the adjacent device. In one embodiment, the second end of the arm is also rotationally attached to a second arm that interconnects the adjacent part to a third part. In the alternative, each added device part is interconnected to the adjacent part using a separate hinge assembly attached to such device parts on a side other than that on which the adjacent part has a hinge assembly interconnecting it to the other part or parts of the electronic device.

In each embodiment, the hinge assembly can provide electrical connection between the device parts through the elements of the assembly so as to maintain connection regardless of the positional adjustment of the parts.

Accordingly, it is a principal object of the present invention to provide a novel and improved hinge assembly for interconnecting two or more parts of an electronic device.

It is another object of the present invention to provide a hinge assembly that provides enhanced adjustability of the position of one electronic device part relative to other device parts.

It is a further object of the present invention to provide a hinge assembly that enhances comfort, efficiency and effectiveness in using an electronic device having two or more parts whose positions are adjustable relative to one another.

It is yet another object of the present invention to provide a hinge assembly that accommodates a broad range of uses for multiple-part electronic devices with which hinge mechanisms are currently used.

It is yet a further object of the present invention to provide a hinge assembly that accommodates transformation of the relative positions of multiple parts of an electronic device from positions suitable for one function to positions suitable for another function.

It is another object of the present invention to provide a hinge assembly that broadly frees the designer in designing the electronic device, and the user in using the device, from restrictions conventionally imposed by hinge mechanisms.

It is yet another object of the present invention to provide a hinge assembly for a multiple-part electronic device that provides electro-rotational interconnections between the two parts of a hinged multiple-part device.

It is yet a further object of the present invention to provide a versatile hinge assembly that provides generally for stable support of each part of a multiple-part electronic device throughout its adjustment range.

It is another object of the present invention to provide a hinge assembly that is light and compact, simple in design, easy to manufacture, easy to incorporate in multiple-part electronic device, and easy to use.

The foregoing and other objects, features and advantages of the invention will be more readily understood upon consideration of the following detailed description of the invention, taken in conjunction with the accompanying drawings.

BRIEF DESCRIPTION OF THE DRAWINGS

FIG. 17 is a perspective view of a detachable embodiment of a hinge assembly according to the present invention, separated from the parts of a two-part electronic device.

FIG. 18 is a perspective view of one end of the detachable embodiment of the hinge assembly shown in FIG. 17.

DETAILED DESCRIPTION OF THE INVENTION

Figure 1:
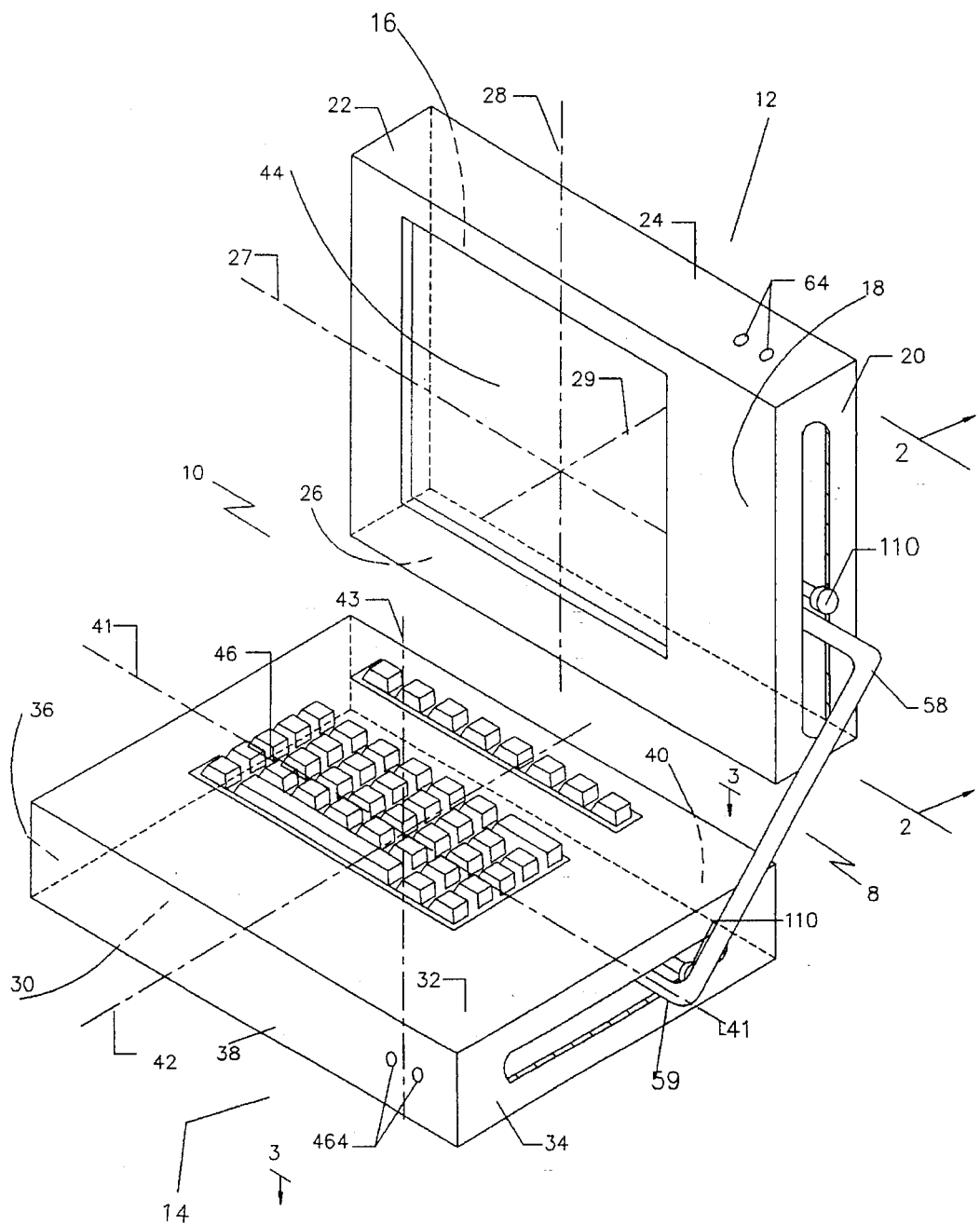
FIG. 1 is a perspective view of a preferred embodiment of a hinge assembly according to the present invention, attached to a two-part electronic device.

A preferred embodiment of the hinge assembly 8 in accordance with the present invention is shown in FIG. 1 attached to a two-part electronic device 10. The device 10, a portable computer in this exemplary case, includes a display part 12 and a base part 14. The display part 12 has an outside surface 16, an inside surface 18, a right side 20, a left side 22, a front side 24 and a back side 26. The display part 12 has a longitudinal axis 27, a latitudinal axis 28, and an elevational axis 29, the axes 27, 28 and 29 being mutually perpendicular. The base part 14 has an outside surface 30, an inside surface 32, a right side 34, a left side 36, a front side 38 and a back side 40. The base part 14 has a longitudinal axis 41, a latitudinal axis 42 and an elevational axis 43, the axes 41, 42 and 43 being mutually perpendicular.

The exemplary display part 12 has a flat panel display 44 mounted to form part of the inside surface 18. The base part 14 has a keyboard 46 mounted to form part of the inside surface 32. Although in the embodiment shown the display part 12 holds the display 44 and base part 14 holds the keyboard 46, it is to be recognized that the hinge assembly may be used with various kinds of multiple-part electronic devices whether or not displays or keyboards are used, without departing from the principles of the invention.

Figure 2:
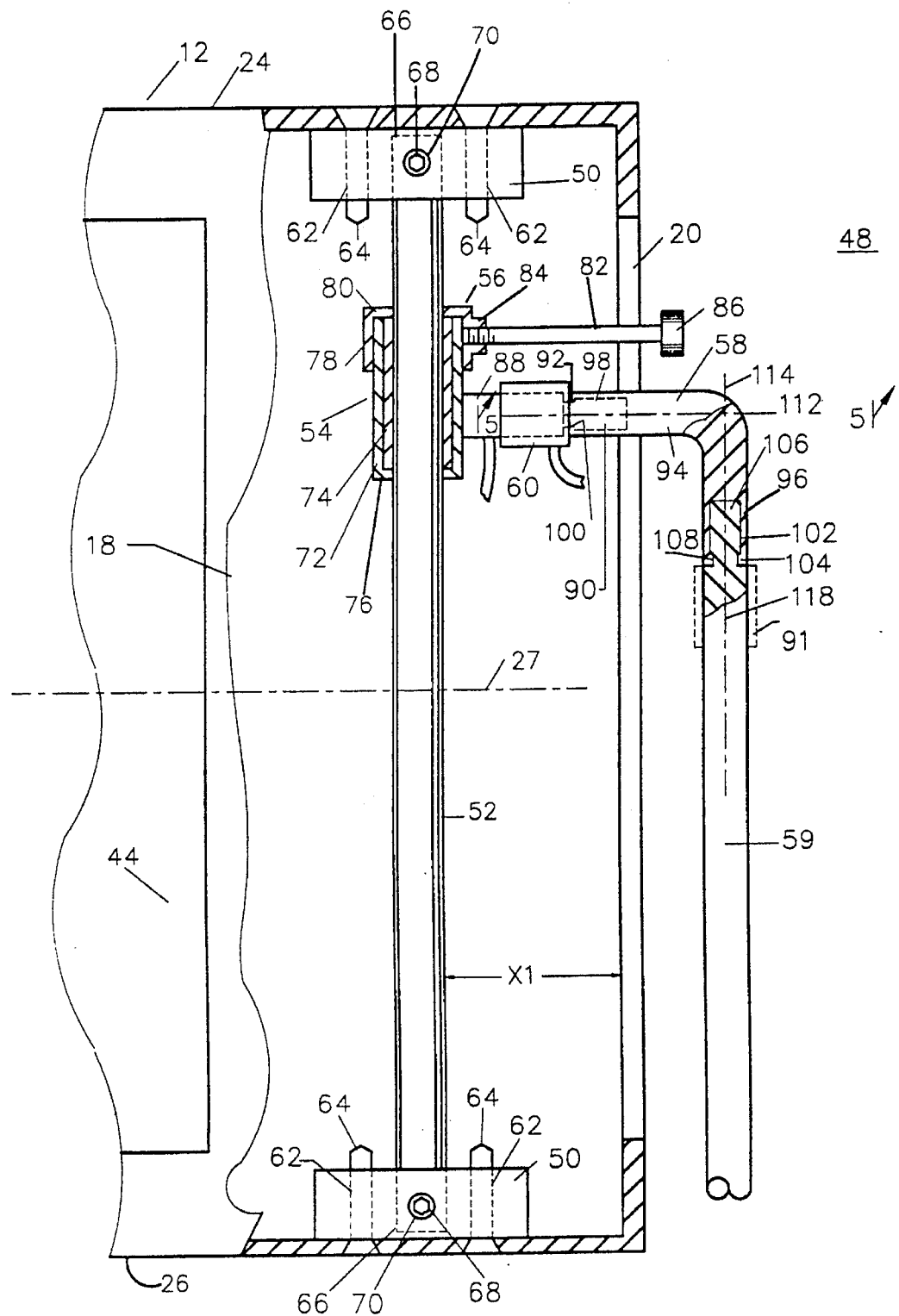
FIG. 2 is a front, partial cross-section of the hinge assembly of FIG. 1 taken along line 2—2 thereof, with the shell of the electronic device partially cut away.
Figure 3:
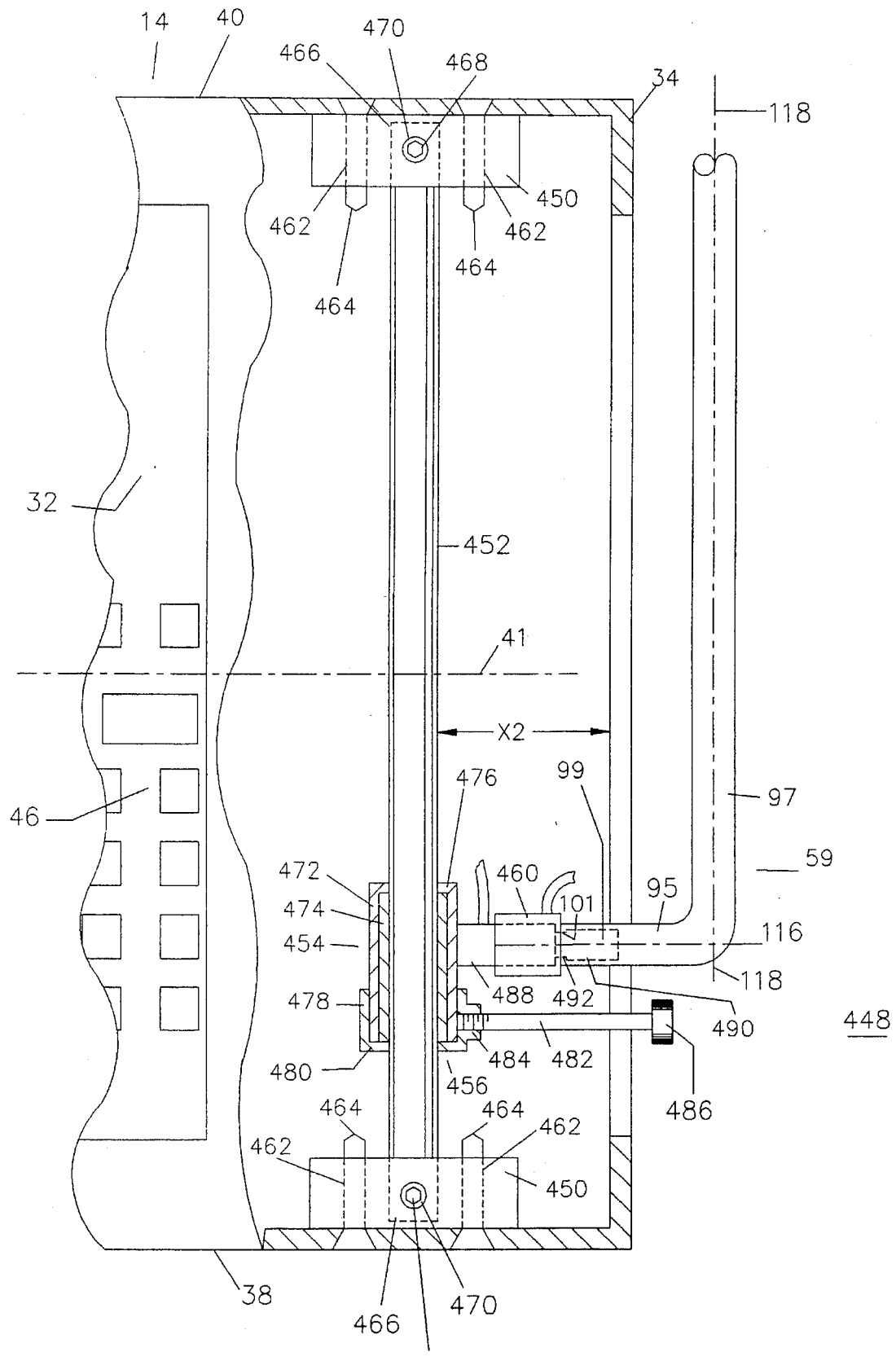
FIG. 3 is a front, partial cross-section of the hinge assembly of FIG. 1 taken along the line 3—3 thereof, with the shell of the electronic device partially cut away.

Referring to FIG. 1, as well as FIGS. 2 and 3, the hinge assembly 8 has a first end 48 and a second end 448, and an arm 59 extending between the two ends. At each respective end 48 and 449, the assembly has end connectors 50 and 450, shafts 52 and 452, sleeves 54 and 454, and clamps 56 and 456. The end connectors 50 and 450 attach the hinge assembly at or adjacent the right sides 20 and 34 of the display part 12 and the base part 14. End connectors 50 are mounted respectively to the front side 24 and back side 26 of the display part 12, adjacent the right side 20 of the display part 12. End connectors 450 are mounted respectively to the front side 38 and back side 40 of the base part 14, adjacent the right side 34 of the base part 14. Each end connector 50 and 450 is a plate having a predetermined thickness, width and depth, and having respective fastener apertures 62 and 462 disposed through the connector adjacent two respective sides thereof. The end connectors 50 and 450 are secured to respective device parts 12 and 14 by insertion of fasteners 64 and 464 through fastener apertures 62 and 462 into the device parts 12 and 14. Preferably, the fasteners 64 and 464 are threaded fasteners such as screws that, when inserted, are flush to the end connectors 50 and 450. Although in the embodiment shown, the hinge assembly is attached to the right sides of the device parts, it is to be recognized that the hinge assembly may be attached to one or more other corresponding sides of the electronic device without departing from the principles of the invention.

Each end connector 50 and 450 seats one end of a respective shaft 52 or 452 in a shaft aperture 66 or 466 disposed in the connector substantially in the middle thereof. Each seated shaft 52 and 452 is secured in the respective shaft aperture 66 or 466 using a fastener 68 or 468 that is tightened onto the shaft through a lateral aperture 70 or 470 disposed in the side of the connector. Each shaft aperture 66 and 466 extends approximately three-quarters of the way into the respective end connector 50 and 450 rather than fully through the depth thereof so that, when the respective shaft 52 or 452 is seated in the shaft aperture 66 or 466, the shaft cannot slide through the end connectors 50 or 450 if the fastener 68 or 468 fails. Preferably, the fasteners 68 and 468 are set screws.

Each shaft 52 and 452 is slidably attached within a respective sleeve 54 and 454 and clamp 56 or 456. To provide for sliding within respective sleeve 52 and clamp 56, the shaft 52 of the display part 12 has its longitudinal axis parallel to and offset by a predetermined, constant distance X1 from the right side 20 of the display part 12. Similarly, to provide for sliding within respective sleeve 452 and clamp 456, respective shaft 452 of the base part 14 has its longitudinal axis parallel to and offset by a predetermined, constant distance X2 from the right side 34 of the base part 14. Distances X1 and X2 provide clearance for respective sleeves 54 and 454 and clamps 56 and 456. Distances X1 and X2 need not be equal. The shafts 52 and 452, sleeves 54 and 454 and clamps 56 and 456 for each part are disposed so as to provide clearance in the directions of the respective outside surfaces 16 and 30, inside surfaces 18 and 32 and left sides 22 and 36.

Each sleeve 54 and 454 includes a cylindrical sleeve shell 72 or 472 and a cylindrical washer 74 or 474, disposed over and coaxial with respective shaft 52 or 452. Each sleeve shell 72 or 472, at one end, has an annular member 76 or 476 directed from the sleeve shell 72 or 472 toward the surface of the respective shaft 52 or 452, so as to fit closely to that shaft 52 or 452. Each sleeve shell 72 and 472, at the other end, is open. Each sleeve shell 72 and 472 has a clinch slot (not shown) along its full length, the clinch slot being cut fully through the thickness of the sleeve shell 72 or 472.

Each washer 74 and 474 is disposed between the respective sleeve shell 72 or 472 and shaft 52 or 452, and has a thickness substantially equal to the difference between the inside diameter of the sleeve shell 72 or 472 and the diameter of the shaft 52 or 452. Each washer 74 and 474 has a length substantially equal that of the respective sleeve shell 72 or 472 less the width of the sleeve annular member 76 or 476 so as to extend from the sleeve annular member 76 or 476 thereof to the open end of that sleeve shell 72 or 472. Each washer 74 and 474 has a clinch slot (not shown) along its full length, the clinch slot being cut fully through the washer's thickness.

Each clamp 56 and 456 has a cylindrical clamp shell 78 or 478 having an inside diameter slightly larger than the outside diameter of the sleeve shell 72 or 472 of the respective sleeve 54 or 454. Each clamp shell 78 and 478 is coaxial with the respective shaft 52 or 452, sleeve shell 72 or 472 and washer 74 or 474. Each clamp shell 78 and 478, at one end, has a clamp annular member 80 or 480 directed from the clamp shell 78 or 478 toward the surface of the respective shaft 52 or 452, so as to fit closely to that shaft 52 or 452. Each clamp shell 78 and 478, at the other end, is open. Each clamp 56 and 456 is seated over the open end of the respective sleeve 54 or 454 so that the clamp shell 78 or 478 fits over that sleeve shell 72 or 472 and the clamp annular member 80 or 480 closes the open end of that sleeve shell 72 or 472 to hold the respective washer 74 or 474 in position between that sleeve shell 72 or 472 and the respective shaft 52 or 452.

Each clamp 56 and 456 includes a tightening mechanism. Each tightening mechanism has an elongate screw 82 or 482 inserted into a threaded holder 84 or 484 that is attached to the respective clamp shell 78 or 478 centered on a bore (not shown) therethrough. Each screw 82 and 482 extends away from respective clamp 56 or 456 and, at its free end, has a head 86 or 486 accessible to the user on the outside of the device part. Each clamp 56 and 456 is adjusted for tightness by the user turning the head 86 or 486 to tighten or loosen the screw 82 or 482 against the respective sleeve shell 72 or 472. The screws 82 and 482 preferably cannot be fully unscrewed from the respective threaded holder 84 or 484. Although in the embodiment shown each tightening mechanism comprises the screw 82 or 482, holder 84 or 484 and bore, it is to be recognized that the tightening mechanism may be provided by other structure without departing from the principles of the invention. For example, the tightening mechanism may be provided by a screw, holder and bore wherein the screw either does not have a head with which the user may adjust the clamp's tightness, or has a head that is not accessible to the user; in such case, the clamp has a predetermined tightness that cannot be adjusted by the user.

Each clamp 56 and 456 preferably is adjusted to tighten the respective sleeve shell 72 or 472 and washer 74 or 474 so that the respective shaft 52 or 452 cannot slide within that sleeve 54 or 454 unless urged by the user. The washers 74 and 474 are made of a material, such as plastic, that provides frictional contact between the sleeves 54 and 454 and the shafts 52 and 452 such that, when the clamps 56 and 456 are properly adjusted, the sliding movement of the shafts 52 and 452 within the sleeves 54 and 454 is smooth and controlled. When the clamps 56 and 456 are tightened, the shells 72 and 472 and washers 74 and 474 are compressed by taking up their respective clinch slots.

With its clamp 56 properly adjusted, the display part 12 may be lineally adjusted relative to its sleeve 54 by urging the display part 12 so that the shaft 52 attached to the display part 12 slides within that sleeve 54. The lineal adjustment is in the direction of the display part's latitudinal axis 28, though that axis 28 may vary in orientation relative to the axes 41, 42 and 43 of the base part 14 as a result of rotational adjustments described herein. Similarly, with its clamp 456 properly adjusted, the base part 14 may be lineally adjusted relative to its sleeve 454 by urging the base part 14 so that the shaft 452 attached to the base part 14 slides within that sleeve 454. The lineal adjustment is in the direction of the base part's latitudinal axis 42, though that axis 42 may vary in orientation relative to the axes 27, 28 and 29 of the display part 12 as a result of rotational adjustments described herein.

Although in the embodiment shown the shafts 52 and 452 have circular cross-sectional shapes perpendicular to each shaft's longitudinal axis, and the sleeves 54 and 454 (having respective shells 72 and 472 and washers 74 and 474) and the clamps 56 and 456 (having respective shells 78 and 478) have annular cross-sectional shapes, it is to be recognized that each set of shafts, sleeves and clamps may have some other cross-sectional shapes, without departing from the principles of the invention, provided slidable movement of the shaft within the respective sleeve and clamp is maintained.

It is also to be recognized that the shafts 52 and 452 need not have a common cross-sectional shape. For example, in a hinge assembly interconnecting a two-part electronic device, one shaft, sleeve and clamp set may have circular cross-sectional shapes as shown, while the other shaft, sleeve and clamp may have polygonal cross-sectional shapes, such as squares.

It is to be further recognized that, although in the embodiment shown each sleeve 54 and 454 has one cylindrical washer 74 or 474, each washer 74 or 474 may comprise two or more sections that together substantially form a cylinder and, in such case, a clinch slot is obviated, without departing from the principles of the invention. Moreover, if the shaft 52 or 452 has a polygonal cross-sectional shape, the washers 74 or 474 may comprise two or more rectangular parts, again obviating a clinch slot. It is also to be recognized that washers 74 and 474 may be omitted without departing from the principles of the invention, provided smooth, controlled movement of the shafts 52 and 452 within the sleeves 54 and 454 is achieved. For example, such movement may be achieved without washers 74 or 474 by properly selecting the materials from which the sleeve 54 or 454 and respective shaft 52 or 452 are made or by properly selecting a lubricant or coating on the contact surfaces of sleeve 54 or 454 and shaft 52 or 452, or both.

Figure 4:
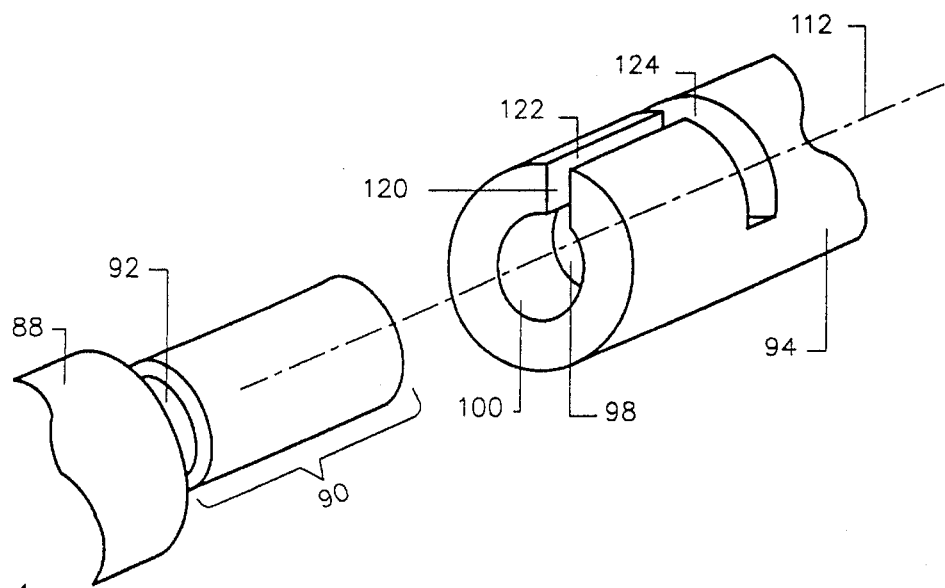
FIG. 4 is an exploded perspective view of a portion of FIG. 2 which shows an exemplary joint end having an annular notch for insertion in an aperture having an annular member and insertion notch.

Referring to FIGS. 2, 3 and 4, each sleeve 54 and 454 has a neck 88 or 488 extending from the substantial middle of the sleeve shell 72 or 472 away from the right side of respective part 12 or 14. Each neck 88 and 488 is disposed substantially at a right angle to the longitudinal axis of its sleeve 54 or 454 and has a predetermined length. Each neck 88 and 488 has a joint end 90 or 490, that has a substantially circular cross-section of predetermined diameter. Each joint end 90 or 490 has a predetermined length and an annular notch 92 or 492 disposed at a predetermined distance from the tip of the joint end. Each annular notch 92 and 492 has a predetermined width, depth and shape. Although in the embodiment shown each notch 92 and 492 has a squared cross-sectional shape and each neck 88 and 488 has a circular cross-sectional shape, it is to be recognized that each notch 92 or 492 may have other cross-sectional shapes and each neck 88 or 488 may have other cross-sectional shapes without departing from the principles of the invention. Moreover, it is to be recognized that the predetermined lengths, diameters, distances, widths, depths and shapes of the necks 88 and 488, joint ends 90 and 490, and annular notches 92 and 492 need not be the same for all sleeves 54 and 454.

Referring to FIGS. 1, 2, and 4, the display part 12 has a knuckle 58, having a first segment 94 and a second segment 96. The first segment 94 has a rotation aperture 98 and an inwardly-directed annular member 100 at the open end of the aperture 98. The annular member 100 has a width and cross-sectional shape corresponding to the width and cross-sectional shape of the annular notch 92 of respective joint end 90. When the joint end 90 is inserted in the aperture 98, it is locked in place by the annular member 100, which fits into the corresponding annular notch 92. The rotation aperture 98 is cylindrical, and has a predetermined length and diameter.

The second segment 96 of the display part 12 has a rotation aperture 102 and an inwardly-directed annular member 104 at the open end of the aperture 102. The second segment's rotation aperture 102 is cylindrical, has a predetermined length which may or may not be equal to the length of rotation aperture 98, and has a predetermined diameter which may or may not be equal to the diameter of rotation aperture 98.

The second segment 96 of the knuckle 58 is connected to the arm 59 (as further described below). To control the stress on the connection imparted by adjusting positions of the parts 12 and 14, the length of the display part's second segment 96 is substantially minimized. It is to be recognized, however, that the length of the second segment could be greater than the minimum without departing from the principles of the invention, provided that the stress on the connection between second segment 96 and arm 59 is controlled.

Referring to FIGS. 1, 2, 3 and 4, the arm 59 has a first portion 95 and a second portion 97. The first portion 95 has a rotation aperture 99 and an inwardly-directed annular member 101 at the open end of the aperture 99. The annular member 101 has a width and cross-sectional shape corresponding to the width and cross-sectional shape of the annular notch 492 of respective joint end 480 of the base part's neck 488. When the joint end 480 is inserted in the arm's rotation aperture 99, the joint end 480 is locked in place by the annular member 101, which fits into the corresponding annular notch 492. The rotation aperture 99 is cylindrical, and has a predetermined length and diameter.

The arm's second portion 97 has a joint end 106 having an annular notch 108. The joint end 106 has a substantially circular cross-section of predetermined diameter and has a predetermined length. The annular notch 108 is disposed at a predetermined distance from the tip of the joint end 106. The annular notch 108 has a predetermined width, depth and shape.

The portions 95 and 97 of arm 59 have predetermined lengths, preferably selected to optimize the positioning adjustability of the device parts 12 and 14 relative to each other.

The knuckle 58 of the display part 12 is constructed so that its rotation apertures 98 and 102 have respective rotational axes 112 and 114 that are disposed substantially at a right angle to each other. The arm 59 is constructed so that its rotation aperture 99 has a rotational axis 116, and its joint end 106 has a rotational axis 118, the axes being disposed substantially at a right angle to each other. The respective rotational axes 114 and 118 of the knuckle 58 and arm 59 are at least parallel, and preferably are coaxial. The respective rotational axes 112 and 116 of the knuckle 58 and arm 59 are parallel and separated by a predetermined distance to enhance the relative positioning adjustability of the parts 12 and 14.

Referring to FIG. 4, the rotation aperture 98 has an insertion slot 120. The insertion slot 120 has a first part 122 cut substantially co-directional with the respective rotational axis 112 fully through both the respective segment 94 and annular member 100 to the rotation aperture 98. The first part 122 is cut substantially the full length of the rotation aperture 98. The insertion slot 120 has a second part 124 cut substantially perpendicular to the first part 122 at the end thereof opposite the respective rotation aperture's open end. The second part 124 is cut to a depth given by the substantial midpoint of the respective rotation aperture's diameter. The insertion slot 120 allows insertion of the joint end 90 past the annular member 100 into the rotation apertures 98 by allowing the respective segment 94 to flex open and then close. Although not separately shown, it is to be recognized that rotation apertures 99 and 102 have structure substantially similar to the insertion slot 120 of rotation aperture 98, so as to allow insertion of respective joint ends 490 and 106 past the annular members 101 and 104 by allowing the respective arm portion 95 or knuckle segment 96 to flex open and then close.

The insertion slots are disposed in the respective segment or arm portion, so that, when the device 10 is in use, any torque effects imparted to the rotatable attachment by gravity or adjustment by the user will tend not to be directed to the insertion slots. For example, when the display part 12 is disposed vertically, the insertion slot 120 in the first segment 94 of the display part's knuckle 58 has its first part 122 directed toward or away from the user so that gravity tends to apply torque to the joint end 90 against uncut parts of the first segment 94.

Each sleeve's joint end 90 and 490 inserts in the rotation aperture 98 or 99 of the respective first segment 94 of knuckle 58 or first portion 95 of arm 59. The length of the rotation aperture 98 or 99 is substantially the same as the length of the respective joint end 90 or 490 so that, when the joint end 90 or 490 is inserted, the respective annular member 100 or 101 fits in the joint end's annular notch 92 or 492 preventing the sleeve 54 or 454 from separating from the knuckle 58 or arm 59. So inserted, each sleeve's joint end 90 and 490 substantially fills the length of the rotation aperture 98 or 99 minimizing any free play in the connection. The diameter of each rotation aperture 98 or 99 is slightly less than the diameter of the inserted joint end 90 or 490 so that, with the joint 90 or 490 inserted in the rotation aperture 98 or 99, the frictional force between the joint end 90 or 490 and respective first segment 94 or first portion 95 is sufficient, depending on the relative weights and dimensions of the elements of the hinge assembly and the device 10, to prevent rotation of the joint end 90 or 492 relative to the first segment 94 or first portion 95, unless rotation is urged by the user.

With the display part's joint end 90 inserted in the first segment's rotation aperture 98, the sleeve 54 is rotatably connected to the first segment 94 such that the display part 12 may be adjustably rotated relative to the first segment 94. The rotation is about rotational axis 112 provided by the first segment 94. The adjustment about rotational axis 112 effects a rotation about the display part's longitudinal axis 27, or parallel thereto if the axis 27 has been adjusted lineally as shown in FIG. 2, by sliding its shaft 52 within the respective sleeve 54 as previously described herein. With the base part's joint end 480 inserted in the first portion's rotation aperture 99, the sleeve 454 is rotatably connected to the first portion 95 such that the base part 14 may be adjustably rotated relative to first portion 95. The rotation is about the rotational axis 116 provided by the first portion 95. The adjustment of the base part 14 about rotation axis 116 effects a rotation about the base part's longitudinal axis 41, or parallel thereto if the axis 41 has been adjusted lineally as shown in FIG. 3 by sliding its shaft 452 within the respective sleeve 454, as previously described herein.

Referring to FIGS. 1, 2, 3 and 4, the knuckle 58 and arm 59 are rotatably connected to each other by their respective second segment 96 and second portion 97, by inserting the joint end 106 of the second portion 97 in the rotation aperture 102 of the second segment 96 of the display part's knuckle 58. The length of the rotation aperture 102 is substantially the same as the length of the joint end 106 so that, when the joint end 106 is inserted, the annular member 104 of the knuckle's second segment 96 fits in the joint end's annular notch 108 preventing the knuckle 58 and arm 59 from separating. So inserted, the joint end 106 substantially fills the length of the rotation aperture 102 minimizing any free play in the attachment. The diameter of the rotation aperture 102 is slightly less than the diameter of the joint end 106 so that, with the joint end 106 inserted in the rotation aperture 102, the frictional force between the joint end 106 and the second segment 96 of the display part's knuckle 58 is sufficient, depending on the relative weights and dimensions of the elements of the hinge assembly and the device 10, to prevent rotation of the joint end 106 relative to the display part's second segment 96, unless rotation is urged by the user.

With the knuckle 58 and arm 59 rotatably connected, the display part 12 and base part 14 may be adjustably rotated relative to the connection. For the display part 12, the second segment 96 of the display part's knuckle 58 provides the rotational axis 114. For the base part 14, the second portion 97 of the arm 59 provides the rotational axis 118. The rotational axes 114 and 118 are coaxial, thence rotation of one part 12 or 14 about respective rotational axis 114 or 118 is equivalent to rotating the other part 14 or 12 about the other rotational axis 118 or 114, but in the opposite direction.

The rotational adjustment of the display part 12 about the rotational axis 114 of the second segment 96 is in the direction of a vector combination of the display part's latitudinal axis 28 and elevation axis 29, depending on the orientation of the axes 28 and 29 due to rotation about rotational axis 112 of its first segment 94, and to lineal adjustment of the display part 12. The rotational adjustment of the base part 14 about rotation axis 118 is in the direction of a vector combination of the base part's latitudinal axis 42 and elevation axis 43, depending on the orientation of the axes 42 and 43 due to rotation about the rotational axis 116 of the first portion 95 of arm 59 and to lineal adjustment of the base part 14.

The shafts 52 and 452, sleeves 54 and 454, clamps 56 and 456, knuckle 58 and arm 59 may be cast aluminum or other material or may be constructed of other conventional materials, such as machine steel. The material should be flexible. If any hardening process is used, its effects on tolerances between elements and on flexibility of the materials should be controlled.

Although in the embodiment shown the shafts 52 and 452, the clamps 56 and 456, and the sleeves 54 and 454 are used to provide lineal adjustment of the display and base parts 12 and 14, it is to be recognized that other structure may be used to provide lineal adjustment without departing from the principles of the invention. For example, a detent column and insert element combination (not shown) may be used. The detent column has two ridged walls, the ridges of one wall being directed toward the ridges of the other wall. The insert element has a ball end disposed in the detent column, and a neck extending from the ball end away from the detent column. The neck is disposed substantially at a right angle to the longitudinal axis of the detent column, has a predetermined length, and has a joint end having substantially equivalent shape and structure as the joint ends 90 and 490 of the sleeves 54 and 454.

To adjust a device part 12 or 14 having a detent column, the user urges the ball end up or down the detent column, forcing the ridged walls of the detent column apart so that the ball end can move along the column. Once the user selects a position, the walls of the detent column grasp the ball end, thereby holding the device part 12 or 14 in that lineal position. The detent column and insert element combination restricts the lineal adjustments to the detent positions rather than providing continuous sliding positions, but does not effect the rotational adjustments of the preferred embodiment.

In addition, lineal adjustment may be provided by a detent shaft mechanism or either a screw mechanism, a rack and pinion mechanism (not shown) or other gearing mechanisms (not shown) without departing from the principles of the invention. The detent shaft mechanism restricts the lineal adjustments to the detent positions rather than providing continuous sliding positions, but does not effect the rotational adjustments of the preferred embodiment. The gearing mechanisms provide the rotational adjustments of the preferred embodiment and continuous lineal adjustment, albeit not a slidable adjustment.

Figure 13:
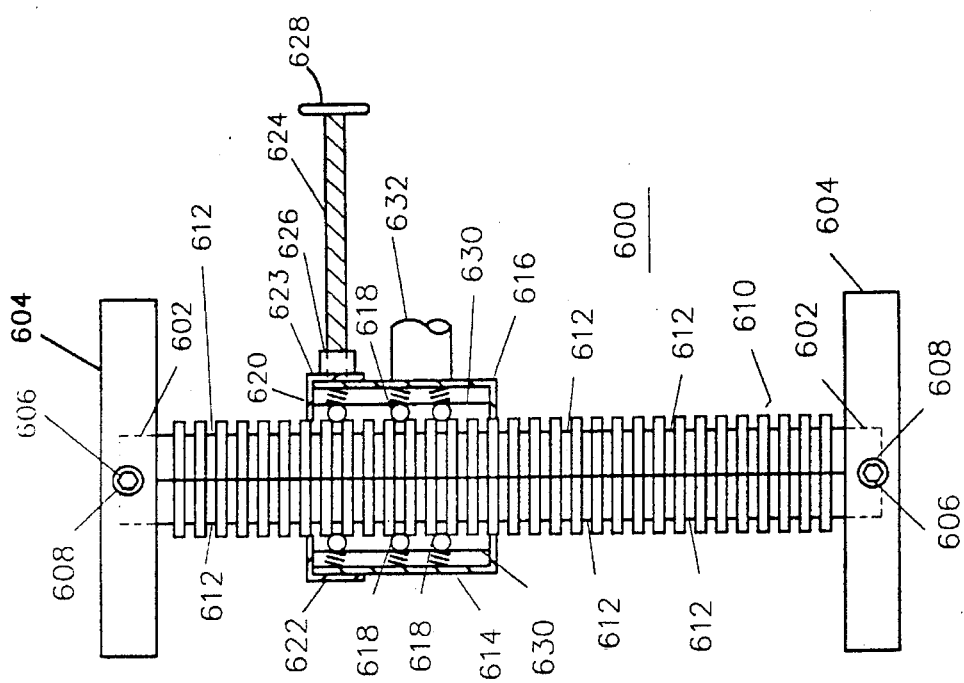
FIG. 13 is a front view of an alternative embodiment of the lineal adjustment portion of the hinge assembly according to the present invention.

Referring to FIG. 13, a detent shaft mechanism 600 is shown which may be used to provide lineal adjustment of the display and base parts 12 and 14 (not shown) in place of the shafts 52 and 452, the clamps 56 and 456, and the sleeves 54 and 454. The detent shaft mechanism 600 has an elongate shaft 610 having a plurality of detent apertures 612 disposed on opposite sides of the shaft 610 along the shaft's entire length. The shaft 610 is seated at each end thereof in respective shaft apertures 602, each aperture 602 being disposed in an end connector 604 and secured therein using a fastener 606 inserted through a lateral aperture 608 in the side of the end connector 604. The end connectors 604, the shaft apertures 602, the fasteners 606 and the lateral apertures 608 are substantially the same as respective end connectors 50 and 450, shaft apertures 66 and 466, fasteners 68 and 468 and lateral apertures 70 and 470, and attach the hinge assembly to display parts 12 and 14 (not shown) in substantially the same way as such respective end connectors 50 and 450, shaft apertures 66 and 466, fasteners 68 and 468 and lateral apertures 70 and 470.

The detent shaft mechanism 600 has a sleeve 614 and a clamp 620. The sleeve 614 has a sleeve shell 616 disposed over the shaft 610, the sleeve shell 616 having a slot along the length thereof and holding a plurality of spring-loaded detent ball assemblies 618, such assemblies being well-known in the art. The clamp 620 has a clamp shell 622 seated over the sleeve shell 616 to enclose the spring-loaded detent ball assemblies 618 within the sleeve shell 616. The clamp 620 includes a tightening mechanism having an elongate screw 624 inserted into a threaded holder 626 attached to the clamp shell 622 centered on a bore 623 that extends through the clamp shell 622. The screw 624 extends away from the clamp 620 and, at its free end, has a head 628. The clamp 620 is adjusted by turning the head 628 to tighten or loosen the screw 624 against a biasing element 630. The screw 624 preferably cannot be fully unscrewed from the threaded holder 626.

The clamp 620 preferably is adjusted to tighten or loosen the sleeve shell 616 so as to adjust the biasing element 630 and, thereby bias the spring-loaded detent ball assemblies 618 with respect to the detent apertures 612. Properly adjusted, the biasing element 630 allows the spring-loaded detent ball assemblies 618 and detent apertures 612 to control the sliding resistance of the sleeve 614 over the shaft 610, preferably so that the shaft 610 cannot slide within the sleeve 614 unless urged by the user.

With the clamp 620 properly adjusted, the device part to which the detent shaft mechanism 600 is attached may be lineally adjusted relative to its sleeve 614 by sliding the shaft 610 within the sleeve 614. The lineal adjustment is in the direction of the part's axis that is parallel to the longitudinal axis of the shaft 610, though that axis of the part may vary in orientation relative to the axes of the other device parts as a result of rotational adjustments, as described hereinabove.

The detent shaft mechanism 600 also has a neck 632 extending from the substantial middle of the sleeve shell 616, disposed substantially at a right angle to the longitudinal axis of the sleeve 614. It is to be recognized that the neck 632 is substantially the same as the necks 88 and 488 in structure and shape, and is connected to a rotational adjustment portion of the hinge assembly as discussed hereinabove.

It is to be recognized that the shaft 610, the sleeve 614 (having sleeve shell 616), the clamp 620 (having clamp shell 622) and the biasing element 630 may have various cross-sectional shapes, without departing from the principles of the invention, provided controlled slidable movement of the shaft within the sleeve is maintained. If the cross-sectional shape of the shaft 610 is circular, it is preferred that the detent apertures 612 comprise annular grooves disposed in planes substantially perpendicular to the longitudinal axis of the shaft 610. It is also to be recognized that the sleeve shell 616 and the clamp shell 622 preferably have dimensions and shapes substantially similar to the dimensions and shapes of respective sleeve shells 72 and 472 and clamp shells 78 and 478. It is also to be recognized that the tightening mechanism may be provided by structure other than the screw 624, the threaded holder 626 and the bore 623 without departing from the principles of the invention. Moreover, the tightening mechanism may or may not be accessible to the user, without departing from the principles of the invention.

Figure 14:
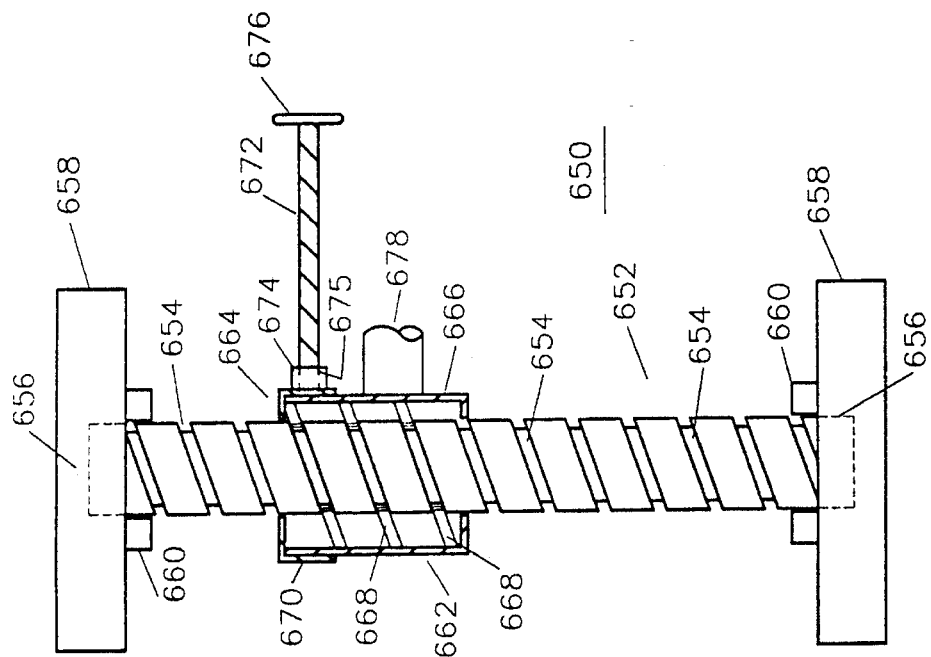
FIG. 14 is another alternative embodiment of the lineal adjustment portion of the hinge assembly according to the present invention.

Referring to FIG. 14, a screw mechanism 650 is shown which may be used to provide lineal adjustment of the display and base parts 12 and 14 (not shown) in place of the shafts 52 and 452, the clamps 56 and 456, and the sleeves 54 and 454. The screw mechanism 600 has an elongate shaft 652 having a continuous spiral groove 654 disposed along the shaft's entire length. The shaft 652 is rotatably seated at each end thereof in respective shaft apertures 656, each aperture 656 being disposed in an end connector 658 and secured therein using a housing 660. The end connectors 658 and the shaft apertures 656 are substantially the same as respective end connectors 50 and 450 and shaft apertures 66 and 466, and attach the hinge assembly to display and base parts 12 and 14 (not shown) in substantially the same way as such respective end connectors 50 and 450 and shaft apertures 66 and 466. Housing 660 preferably contains bearings, or provides a seal holding lubricant within the shaft apertures 656, or otherwise assists the rotation of the shaft 652 in shaft apertures 656. It is to be recognized that the housing 660 may be omitted without departing from the principles of the invention.

The screw mechanism 650 has a sleeve 662 and a clamp 664. The sleeve 662 has a sleeve shell 666 disposed over the shaft 652, the sleeve shell 666 having a plurality of pawls 668 preferably disposed along its inside surface at intervals corresponding to the distance between spirals of the spiral groove 654. The pawls 668 are of a predetermined number and extend a predetermined distance from the inside of the sleeve shell 666 toward the shaft 652. The clamp 664 has a clamp shell 670 seated over the sleeve shell 666. The clamp 664 includes a tightening mechanism having an elongate screw 672 inserted into a threaded holder 674 attached to the clamp shell 670 centered on a bore 675 that extends through the clamp shell 670. The screw 672 extends away from the clamp 664 and, at its free end, has a head 676. The clamp 664 is adjusted by turning the head 676 to tighten or loosen the screw 672 against the sleeve shell 666. The screw 672 preferably cannot be fully unscrewed from the threaded holder 674.

The clamp 664 preferably is adjusted to tighten or loosen the sleeve shell 666 so that the sleeve shell 666 biases the pawls 668 in the spiral groove 654. Properly adjusted, the sleeve shell 666 allows the pawls 668 to slide in the spinal groove 654. It is to be recognized that, although adjustment of the clamp 620 may contribute to controlling the sliding resistance of the sleeve 662 over the shaft 652, preferably the sliding resistance is controlled by using a spiral groove 654 having a predetermined spacing between grooves along the length of the shaft 652 and a predetermined angle of spiral relative to the shaft's longitudinal axis.

Preferably, the sliding resistance provides that the shaft 652 cannot rotate and thereby move lineally within the sleeve 662 unless the user applies a force urging lineal movement of the sleeve 662 relative to the shaft 652. When the user applies such force, for example, by urging the device piece to which the shaft 652 is attached, the shaft 652 rotates about its longitudinal axis within the shaft apertures 656 causing the spiral groove 654 to corkscrew within the sleeve 662. Assuming that the sleeve 662 remains stationary, the rotation of the shaft 652, and resulting corkscrewing of the spiral groove 654, allows lineal motion of the shaft 652 within the sleeve 662. The lineal adjustment is in the direction of the device part's axis that is parallel to the longitudinal axis of the shaft 652, though that axis of the part may vary in orientation relative to the axes of the other device parts as a result of rotational adjustments, as described hereinabove.

It is to be recognized that the shaft 652 preferably has a substantially circular cross-sectional shape and that the sleeve shell 666 and clamp shell 670 preferably have annular cross-sectional shapes. It is also to be recognized that the tightening mechanism may be provided by structure other than the screw 672, the threaded holder 674 and the bore 675 without departing from the principles of the invention. Moreover, the tightening mechanism may or may not be accessible to the user, without departing from the principles of the invention.

The screw mechanism 650 also has a neck 678 extending from the substantial middle of the sleeve shell 666, disposed substantially at a right angle to the longitudinal axis of the sleeve 662. It is to be recognized that the neck 678 is substantially the same as the necks 88 and 488 in structure and shape, and connects to a rotational adjustment portion of the hinge assembly as discussed hereinabove.

Although in the embodiment shown, the two device parts 12 and 14 are interconnected by connecting knuckle 58 and arm 59 to each other by respective second segment 96 and second portion 97, it is to be recognized that the two device parts 12 and 14 may be otherwise connected without departing from the principles of the invention. For example, each part may have a knuckle equivalent to the knuckle 58, so that the parts 12 and 14 may be interconnected by means of an intermediate rod (not shown) having, at each end thereof, structure corresponding to the structure of the respective knuckles. That is, the intermediate rod, at one end, has a joint end for insertion in the rotation aperture of the display part's second segment and, at the other end, has a joint end for insertion in the rotation aperture of the base part's second segment. By using the intermediate rod, there are two rotational connections, one for each part's second segment and respective rotational axis. Accordingly, the display part 12 may be adjustably rotated relative to the intermediate rod independently of the base part being adjustably rotated relative to the intermediate rod.

The intermediate rod may be telescopic. It is also to be recognized that the second portion 97 of the arm 59 or the second segment 96 of the knuckle 58 may have telescopic structure without departing from the principles of the invention.

Although in the embodiment shown the necks 88 and 488 of the sleeves 54 and 454 and the second portion 97 of the arm 59 have respective joint ends 90, 490 and 106, and the segments 94 and 96 of the display part's knuckle 58, and the first portion 95 of the arm 59, have respective rotation apertures 98, 102 and 99, it is to be recognized that necks 88 and 488 and the second portion 97 may have rotation apertures in place of the respective joint ends 90, 490 and 106, and the segments 94 and 96 and the first portion 95 may have joint ends in place of the respective rotation apertures 98, 102 and 99, without departing from the principles of the invention, provided the elements of the hinge assembly are rotatably connected to provide the rotational axes 112, 114, 116 and 118. It is to be further recognized that, although rotational axes 112, 114, 116 and 118 are achieved using joint ends and rotation apertures in the preferred embodiment, other structure may be used to achieve such axes without departing from the principles of the invention. For example, ball-and-socket assemblies, as well as axle-and-bearing assemblies may be used.

It is also to be recognized that, although as shown in the preferred embodiment both parts 12 and 14 have structure providing lineal adjustment thereof, the hinge assembly in some applications may be connected to a device part omitting lineal adjustment structure. For example, for a two-part electronic device, the base part's shaft 452, sleeve 454 and clamp 456 may be replaced by a rigid arm (not shown) fixedly mounted to the base part 14 and rotatably connected to arm 59. Alternatively, the first portion 95 of the arm 59 may be rotatably mounted directly to the base part 14 by (i) replacing the first portion's rotation aperture 99 with a joint end having structure substantially similar to the arm's joint end 106 and (ii) providing a rotation aperture in the base part 14 in which the first portion's joint end is inserted. In this alternative, the first portion has an annular notch and the base part's rotational aperture has an annular member, or the elements have some equivalent structure, so that when the joint end is inserted in the rotational aperture, the joint end is locked in the aperture.

The hinge assembly of the present invention preferably provides for detaching adjacent device parts. To provide for detaching device parts, a connector and jam nut assembly (not shown), as is well-known in the art, is used as part of the arm's second portion 97.

The hinge assembly of the present invention provides for electrical connection for lineal and rotational adjustment elements in the assembly. The electrical connection respecting the lineal adjustment elements of either device part 12 or 14 generally can be accomplished by using a flexible length of cable approximately equal in length to the respective shaft 52 or 452. The electrical connection respecting each rotational connection of hinge assembly elements, preferably should not use a flexible cable because repeated rotations could either snap one or more of the cable's leads, tear the cable from its connections or otherwise result in circuit failure. Accordingly, each rotational connection requires an electro-rotational connector 60, 91 or 460 that resists circuit failure due to rotational adjustment. Although in the embodiment shown, the rotational connection between the arm 59 and knuckle 58 shows only the location of an electro-rotational connector 91, it is to be understood that the electro-rotational connector is substantially the same as connectors 60. It is also to be understood that the electro-rotational connector 460 is substantially the same as the electro-rotational connector 60.

Figure 5:
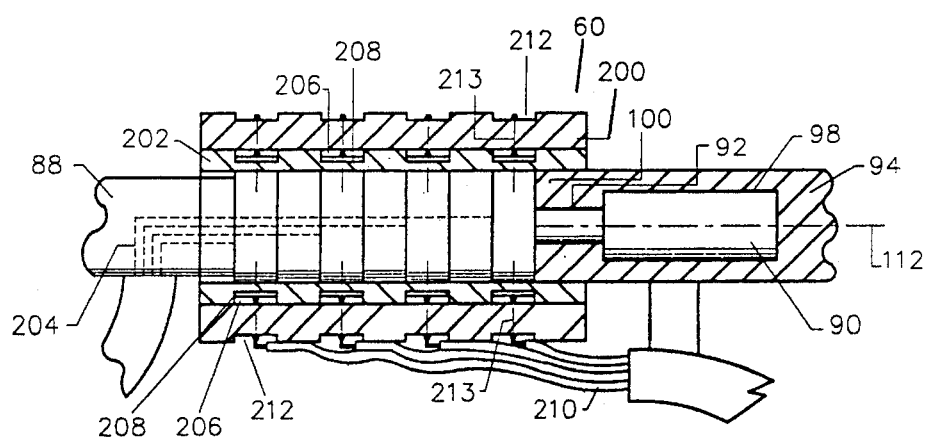
FIG. 5 is a partial cross-section of a portion of FIG. 2 taken along line 5—5 thereof showing one embodiment of an electro-rotational connector.

Referring to FIGS. 2 and 5, one exemplary embodiment of the electro-rotational connector 60 of the present invention is shown connecting the display part's neck 88 and the first segment 94 of the knuckle 58. The electro-rotational connector 60 has, mounted to the first segment 94, an outer cylinder 200 that houses an inner cylinder 202 mounted to the neck 88. The cylinders 200 and 202 are annular and rotate about rotational axis 112 of the first segment 94. The cylinders 200 and 202 are mounted respectively to the first segment 94 and the neck 88, such that all lineal movement between the cylinders 200 and 202 is substantially eliminated and all lineal and rotational movement of the cylinders 200 and 202 relative to respective first segment 94 and neck 88 is substantially eliminated. The cylinders 200 and 202 are insulators.

Insulated wires 204 carrying electrical signals are directed through the inside of the inner cylinder 202, between the neck 88 and the inside surface of the cylinder 202. The inner cylinder 202 has an inside diameter substantially equal to the diameter of the neck 88 plus twice the diameter of a characteristic wire 204 so that the inner cylinder 202 fits over the neck 88 and wires 204. The inner cylinder 202 has annular grooves 206 spaced along its outside surface adjacent the inside surface of the outer cylinder 200. The grooves 206 may have variable widths depending, for example, on the current of the signal. Each groove 206 fixedly seats a conductive ring 208 at the bottom thereof to which one of the wires 204 is electrically connected via an aperture (not shown) connecting the groove's bottom and the inside surface of the inner cylinder 202.

The outer cylinder 200 has insulated wires 210 directed along its outside surface, each wire 210 corresponding to a wire 204. The outer cylinder 200 has an inside diameter slightly greater than the outside diameter of the inner cylinder 202 so that the inner cylinder 202 may be housed within the outer insulative cylinder 200 and the cylinders 200 and 202 may rotate freely with respect to each other.

The outer cylinder 200 has annular grooves 212 spaced along its outside surface, aligning with the corresponding annular grooves 206 of the inner cylinder 202. The grooves 212 have variable widths corresponding to the variable widths of the annular grooves 206 of the inner cylinder 202. At their bottom, each groove 212 has two opposed apertures 213 connecting the groove 212 to the inside surface of the outer cylinder 200. Preferably, the apertures 213 are diametrically opposed.

To complete a circuit, one of the wires 210 is directed into an annular groove 212 of the outer cylinder 200, a portion of the wire 210 is stripped of its insulation and passed through one aperture 213 therein, is directed into an annular groove 206 of the inner cylinder 202, wrapped around the inner cylinder 202 until encountering the second aperture 213 of the original annular groove 212 of the outer cylinder 200, is passed through that second aperture to the outside surface of the outer cylinder 200 and terminated in the original groove 212. Electrical contact is made between the wires 204 and corresponding wires 210 when the wires 210 are directed into the annular grooves 206 of the inner cylinder 202 wherein the wires 210 make contact with the conductive rings 208. To force such contact, the annular grooves 206 of the inner cylinder 202 have depths substantially equal to the thickness of the conductive rings 208 plus the diameter of the stripped wire 210.

Figure 6:
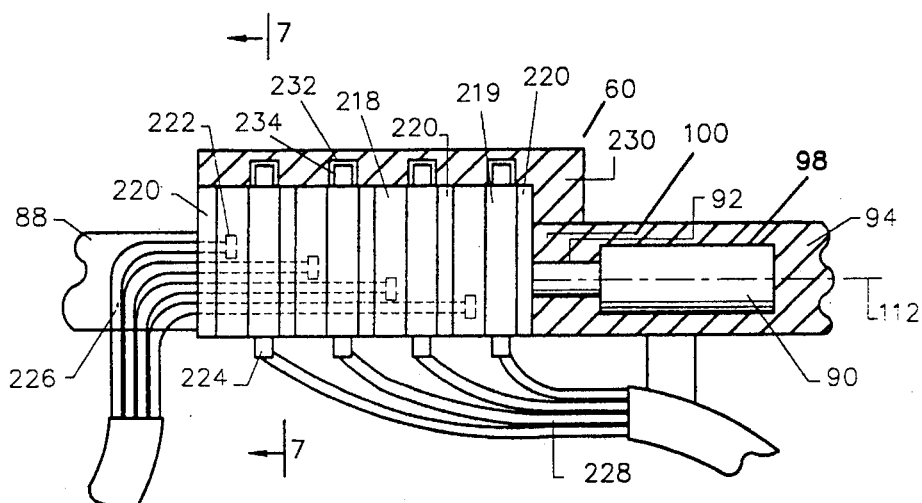
FIG. 6 is a preferred embodiment of the electro-rotational connector of FIG. 2.
Figure 7:
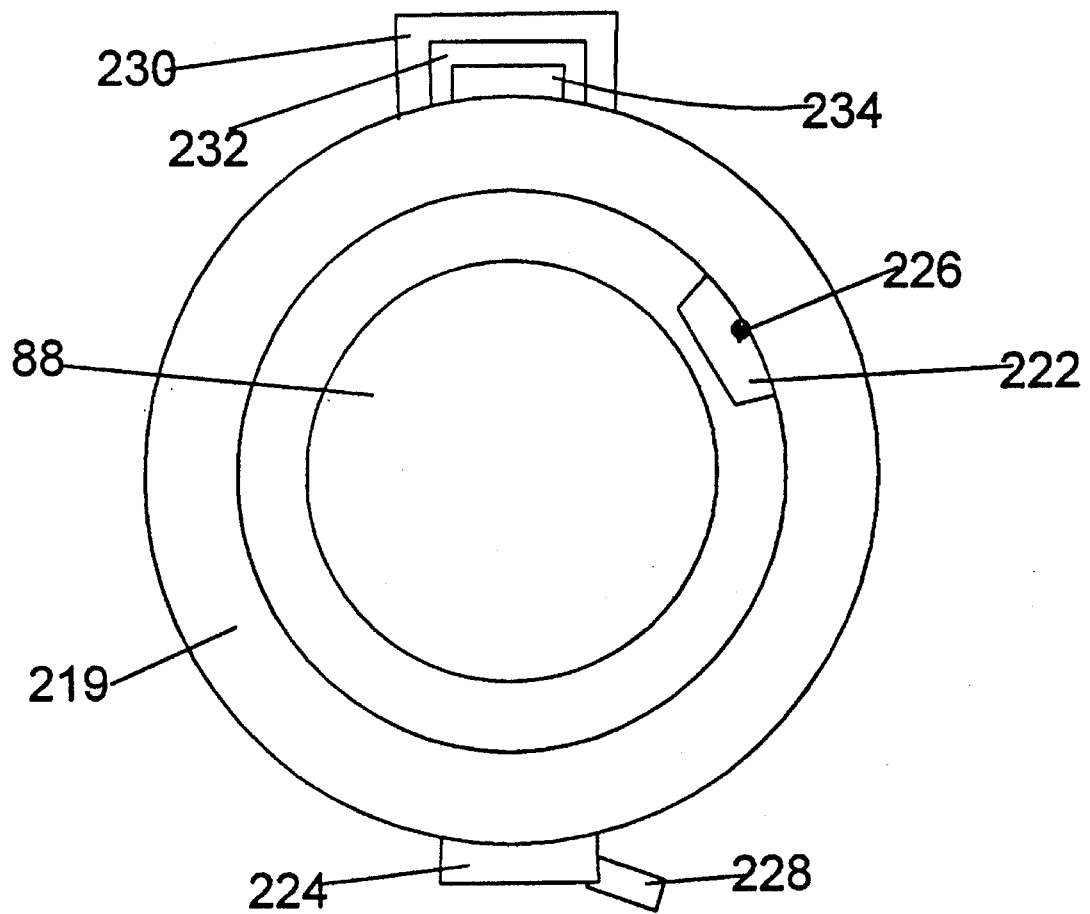
FIG. 7 is a cross-section of a portion of FIG. 6 taken along line 7—7 thereof.

Referring to FIGS. 2, 6 and 7, a second exemplary embodiment of the electro-rotational connector 60 of the present invention is shown having a plurality of paired conducting washers 218 and 219 disposed over neck 88 of the display part's sleeve 54. Each conducting washer 218 has a conducting annular face (not shown) disposed flat against a conducting annular face (not shown) of the paired conducting washer 219, the washers 218 and 219 being sandwiched between insulative washers 220. Although the conducting washers 218 and 219 as shown are annular rings, it is to be recognized that the washers 218 and 219 may be annular sections of rings, provided that the respective sections of each washer 218 and 219 in a pair of washers maintain electrical connection regardless of their relative rotational positions.

Each conducting washer 218 has an inside connection tab 222 disposed on the washer's inside surface, and each conducting washer 219 has an outside connection tab 224 disposed on the washer's outside surface. The conducting washers 218 and the insulative washers 220 are fixedly mounted on the neck 88 by an adhesive, a tight fit or other means. The conducting washers 219 are rotatably mounted to the neck 88. In fixing the conducting washers 218 to the neck 88, it is preferred that the inside connection tabs 222 are disposed at regular intervals around the periphery of the neck 88. The neck 88 is insulated from the conducting washers 218 by an insulating coating, sleeve, or other means (not shown). Insulated wires 226 carrying electrical signals are directed through the inside diameter of the washers 218, 219 and 220, between the neck 88 and the inside surface of the washers 218, 219 and 220. So that the wires 226 may be so directed, the washers 218, 219 and 220 have an inside diameter substantially equal to the diameter of the neck 88 plus twice the diameter of a characteristic wire 226 or thickness of inside connection tab 222 whichever dimension is greater. Each insulated wire 226 is electrically connected to one of the inside connection tabs 222. Each of a plurality of insulated wires 228 are electrically connected to one of the outside connection tabs 224.

To complete a circuit, a signal is directed from an insulated wire 228 to a conducting washer 219 of a pair of conducting washers 218 and 219 which is in electrical contact with the pair's second conducting washer 218 at their respective annular faces, so that the signal is directed to one of the coated wires 226 to be carried further in the circuit. The signal is isolated from other signals by the conducting washers 218 and 219 being sandwiched between insulative washers 220.

The electro-rotational connector preferably has a cover 230 for rotating the conducting washers 219 and holding the conducting washers 219 away from insulated wires 226 so as to reduce stress on insulated wires 226 and 228. The cover 230 is fixedly mounted to the first segment 94 of the knuckle 58 and preferably has a plurality of apertures 232 disposed along the surface of the cover 230 directed toward the outside surface of the washers 218, 219 and 220. The inside surface of the cover 230 preferably is close to, but not in contact with, the outside surface of the washers 218, 219 and 220. In order to be moved by the cover 230, each conducting washer 219 has a rotation tab 234 disposed on the outside surface of the washer 218 so as to be seated and held in a respective aperture 232 of the cover 230. When the display part 12 is rotated about rotational axis 112, the cover 230 being fixedly mounted to the first segment 94 of the knuckle 58 remains stationary such that the rotation tabs 234 being seated in the cover's apertures 232 also remain stationary, thereby rotate forcing respective conducting washers 219 to remain stationary relative to axis 112. However, conducting washers 218 being fixedly mounted to the display part's neck 88 rotate relative to axis 112 and thereby relative to the stationary conducting washers 219. In this relative rotation, the electrical connection is maintained because each conducting washer of a pair remain in contact. Although the cover 230 as shown is an elongate annular segment, it is to be recognized that the cover 230 may have other shapes without departing from the principles of the invention.

The hinge assembly provides a plurality of independent rotational and lineal adjustments for fixing the relative positions of the parts of an electronic device. With reference to the two part electronic device 10 of FIGS. 1, 2 and 3 and assuming the base part 14 remains stationary, the display part 12 may be moved by sliding the shaft 52 within the sleeve 54 of the display part 12. After the lineal position is adjusted, the display part's sleeve 54 and clamp 56 hold the part in its selected position relative to the base part 14. The display part 12 may also be rotated about the rotation axis 112 of the first segment 94 of the display part's knuckle 58. After that rotational adjustment, the display part 12 is held in place by frictional forces between the joint end 90 and the first segment 94. Similarly, the display part 12 may be rotated about the rotation axis 114 of the second segment 96 of the display part's knuckle 58. After that adjustment, the display part 12 is held in place by frictional forces between the second segment 96 and, in the preferred embodiment, the joint end 106 of the arm 59.

Moreover, the position of the display part 12 may be adjusted by rotating the display part about the rotational axis 116 of the first portion 95 of the arm 59. In addition, the lineal position of the display part 12 may be further adjusted relative to the stationary base part 14 by sliding base part's sleeve 454 over its shaft 452. Again, frictional forces hold the display part 12 in place after such adjustments. These lineal and rotational adjustments may be effected largely independently of each other such that a wide variety of sequential and combinational adjustments may be accomplished for both parts 12 and 14.

FIGS. 9, 10, 11 and 12 show four different sequences of positions of the display part 12 relative to the base part 14. In the Figures, reference letters D and K indicate, respectively, the exposed surfaces of the display 44 and of the keyboard 46. It is to be understood that these Figures show only to a limited degree the rotational and lineal adjustments provided by the hinge assembly.

Figure 9:
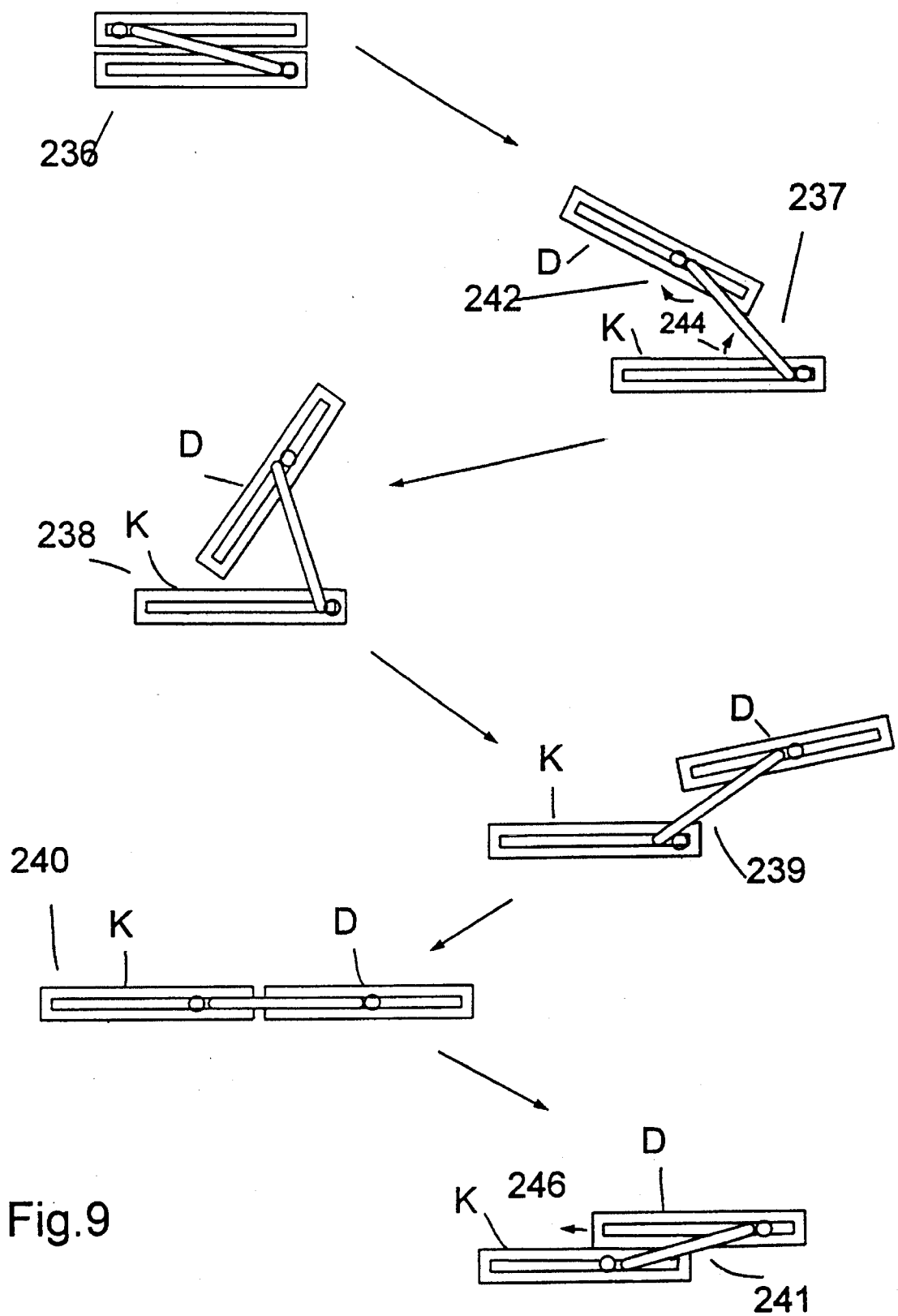
FIG. 9 is a first sequence of side views of two parts of an electronic device connected by the hinge assembly of FIG. 1 and placed in various relative positions.

Referring to FIG. 9, the sequence of positions starts with position 236 wherein the display part 12 is seated flat on the base part 14 so that the display faces toward and covers the keyboard. Positions 237 and 238 show the display part 12 being rotated about axes 112 and 116 of the parts 12 and 14 as indicated by respective arrows 242 and 244, to a position having the display 44 facing the user with the keyboard 46 exposed for use. From that relative position 238, the display part 12 is progressively rotated and translated until, as shown by position 241, the display part 12 rests flat on the base part 14 with both the display 44 and keyboard 46 exposed for use. From position 241, the display part 12 may be further translated in the direction of arrow 246 so as to fully cover the inside surface of base part 14 which position (not shown) is useful when the electronic device is to be used solely for pen-based input.

Figure 10:
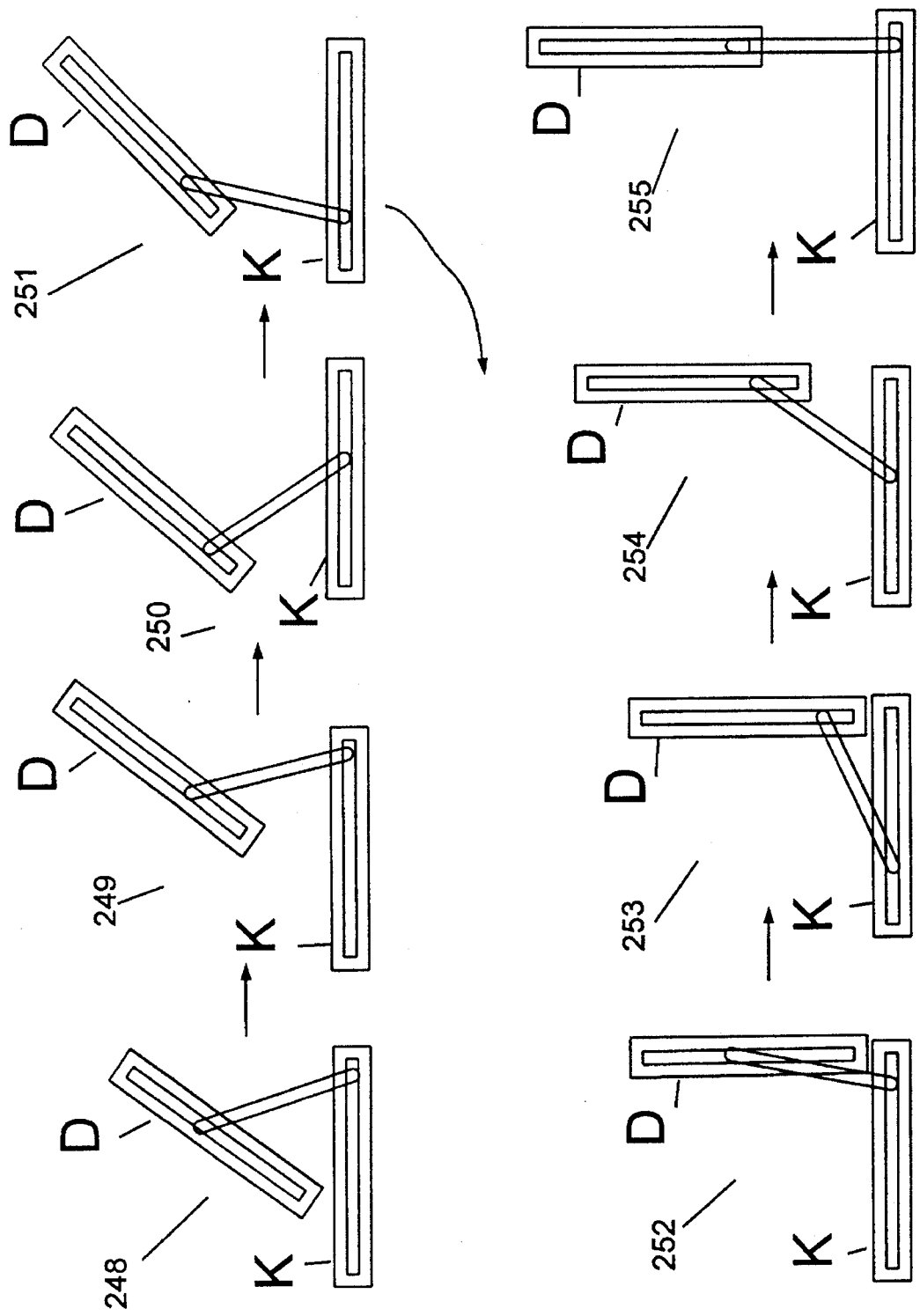
FIG. 10 is a second sequence of side views of two parts of an electronic device connected by the hinge assembly of FIG. 1 and placed in various relative positions.

In FIG. 10, the sequence of positions 248–255 further illustrate the flexibility of the hinge assembly in selecting the relative positions of the display part 12 and the base part 14.

Figure 11:
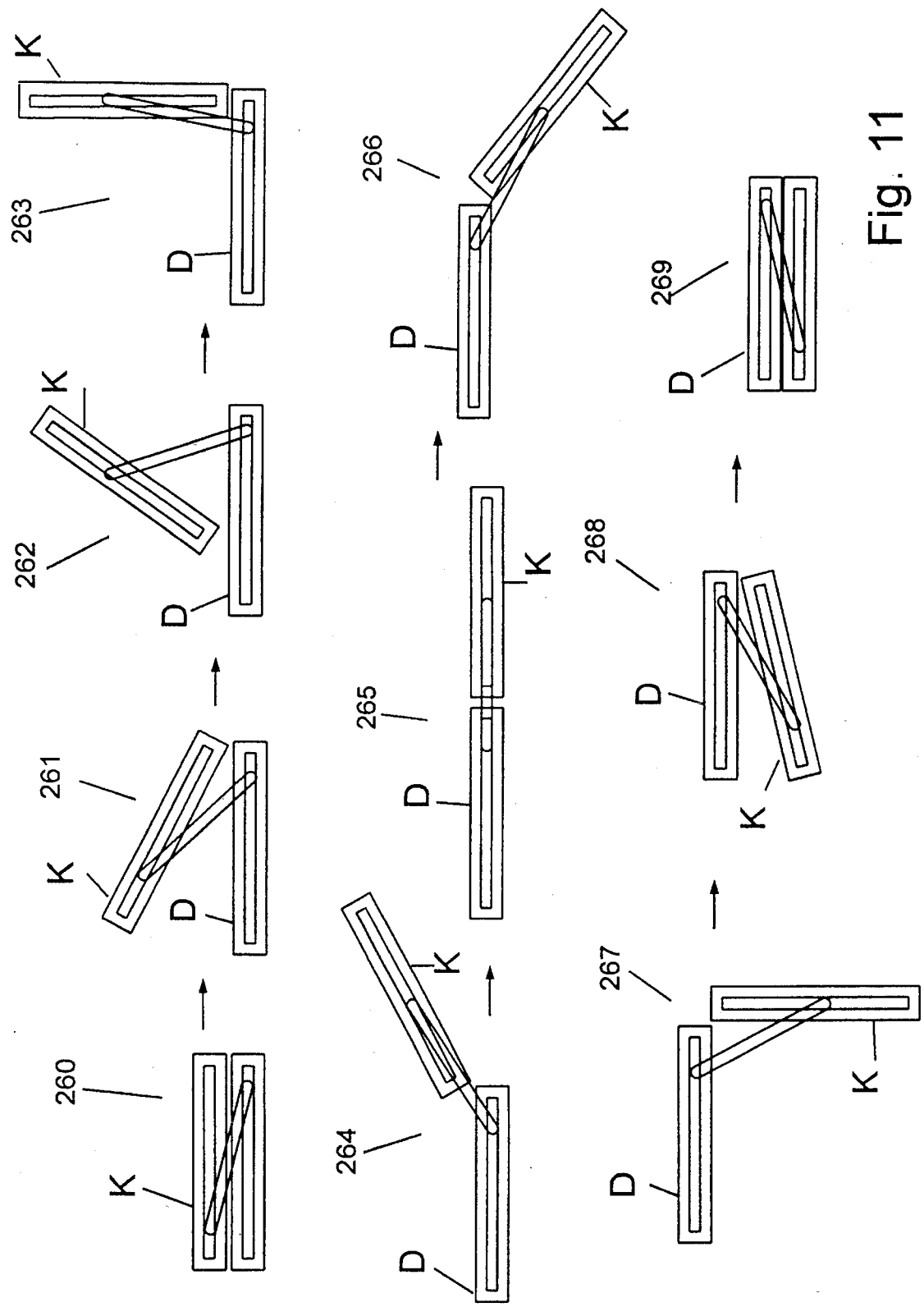
FIG. 11 is a third sequence of side views of two parts of an electronic device connected by the hinge assembly of FIG. 1 and placed in various relative positions.

In FIG. 11, the sequence of positions 260–269 start with the base part 14 seated flat on the display part 12 so that the keyboard 46 is exposed for use and the display 44 is covered. Positions 260–269 show the rotation and translation of the base part 14 to achieve a position wherein the display is exposed for use and the keyboard faces toward and is covered by the outside surface of the display part 12.

Figure 12:
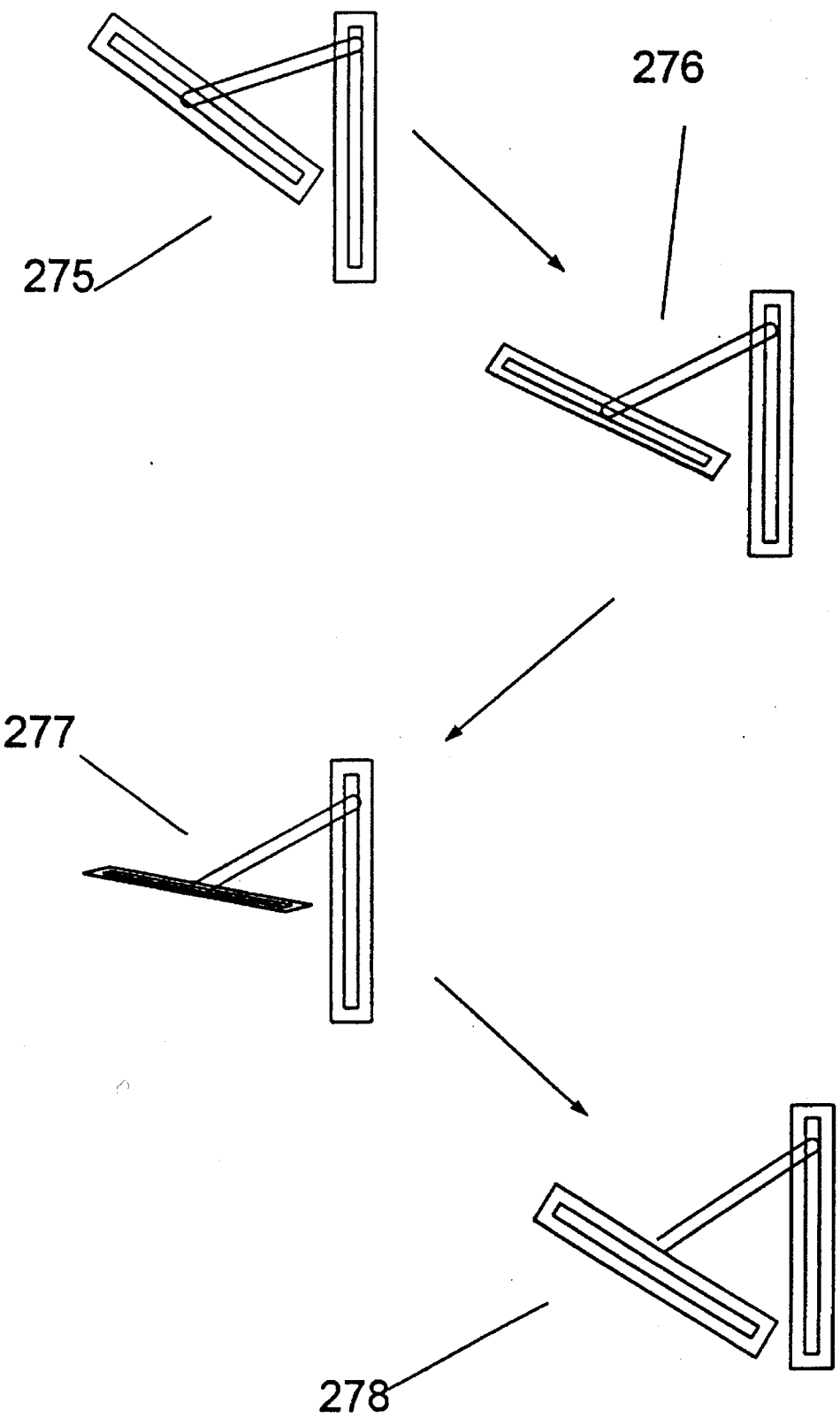
FIG. 12 is a fourth sequence of side views of two parts of an electronic device connected by the hinge assembly of FIG. 1 and placed in various relative positions.

In FIG. 12, the sequence of positions illustrates the rotation of display part 12 about rotational axis 114 of second segment 96 of the display part's knuckle 58.

In the preceding paragraphs, the description of the adjustments in the relative positions of first and second parts of an electronic device reflect the assumption that the base part remains stationary, as if on a desk top, on one's lap or the like. However, it is to be recognized that the hinge assembly does not require one part to remain stationary in adjusting the relative positions of the device's parts.

Figure 15:
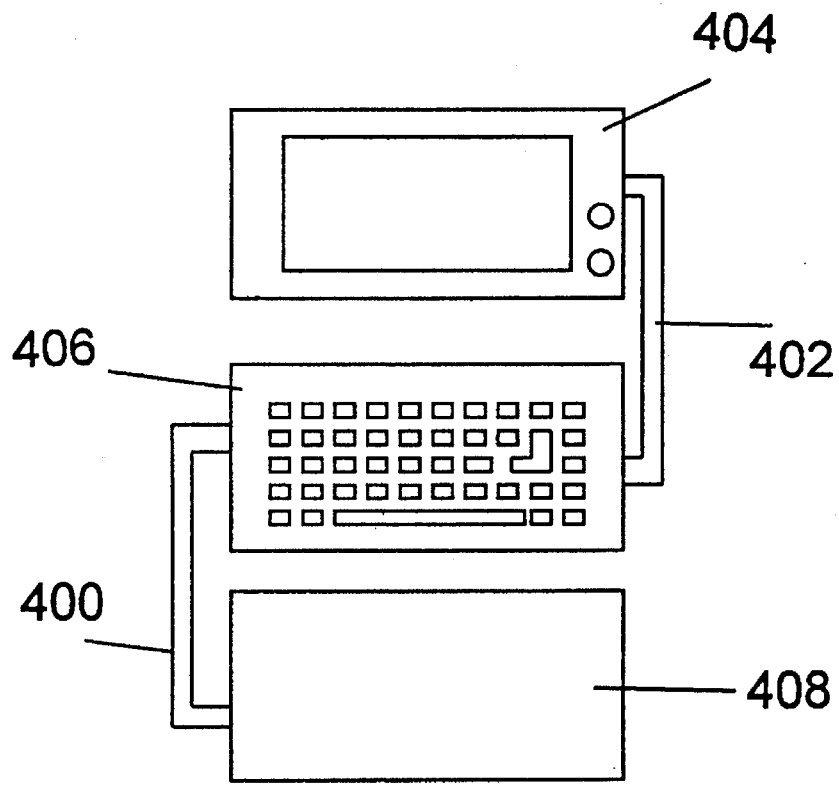
FIG. 15 is a front view a of three-part electronic device wherein the parts are interconnected by two hinge assemblies according to the present invention.

Although the invention is described in the context of and adapted for a two-part electronic device, it is to be understood that the hinge assembly could also be used with electronic devices having more than two parts without departing from the principles of the invention. Referring to FIG. 15, hinge assemblies 400 and 402, each having structure substantially the same as the hinge assembly 8 described above, are used to interconnect a three-part electronic device. Hinge assembly 400 interconnects a first part 404 and a second part 406, and the hinge assembly 402 interconnects the second part 406 and a third part 408. The hinge assemblies 400 and 402 preferably are disposed on opposite sides of the paired parts 404, 406 and 406, 408.

Figure 8:
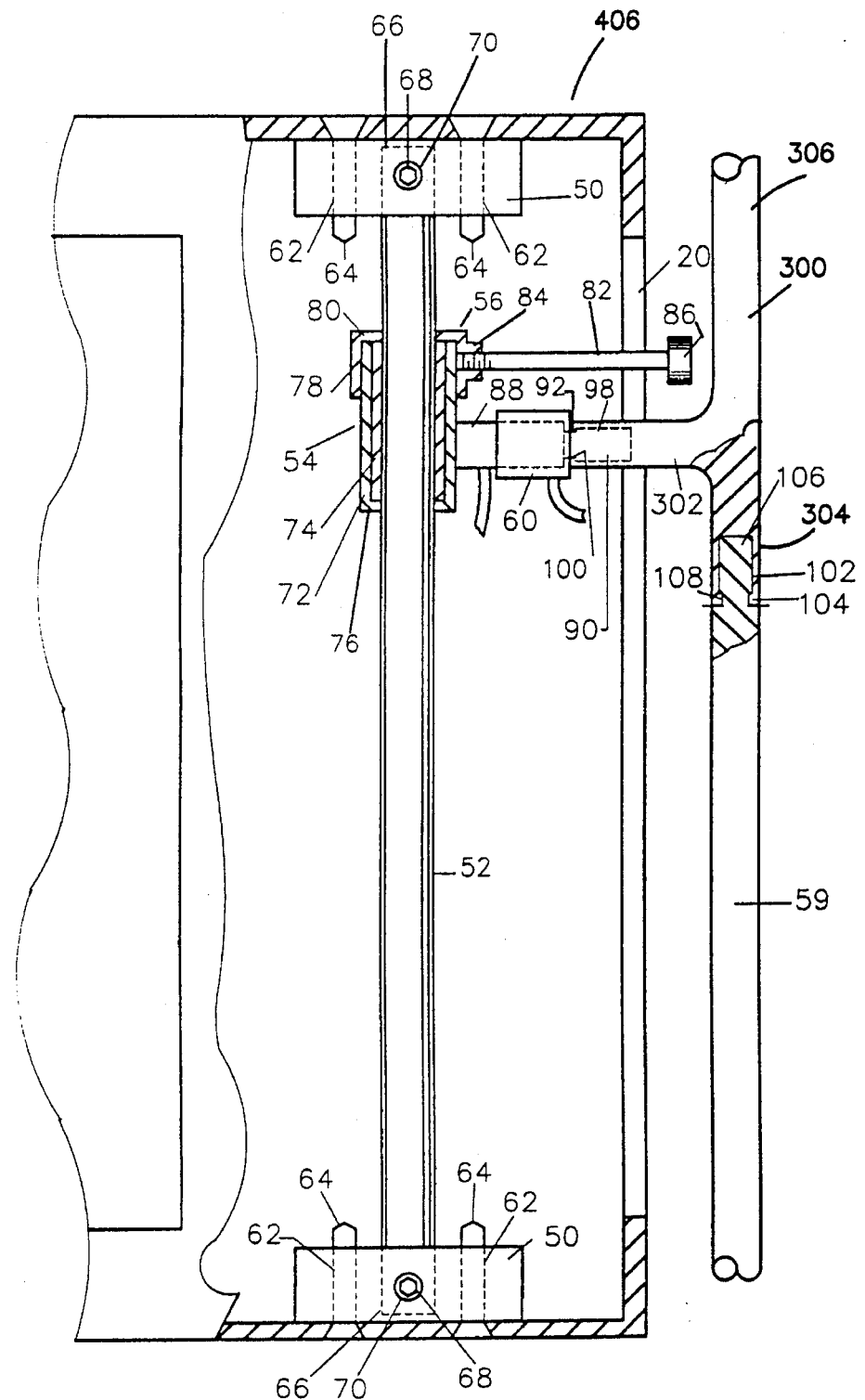
FIG. 8 is a front, partial cross-section of an alternative embodiment of the hinge assembly according to the present invention.
Figure 16:
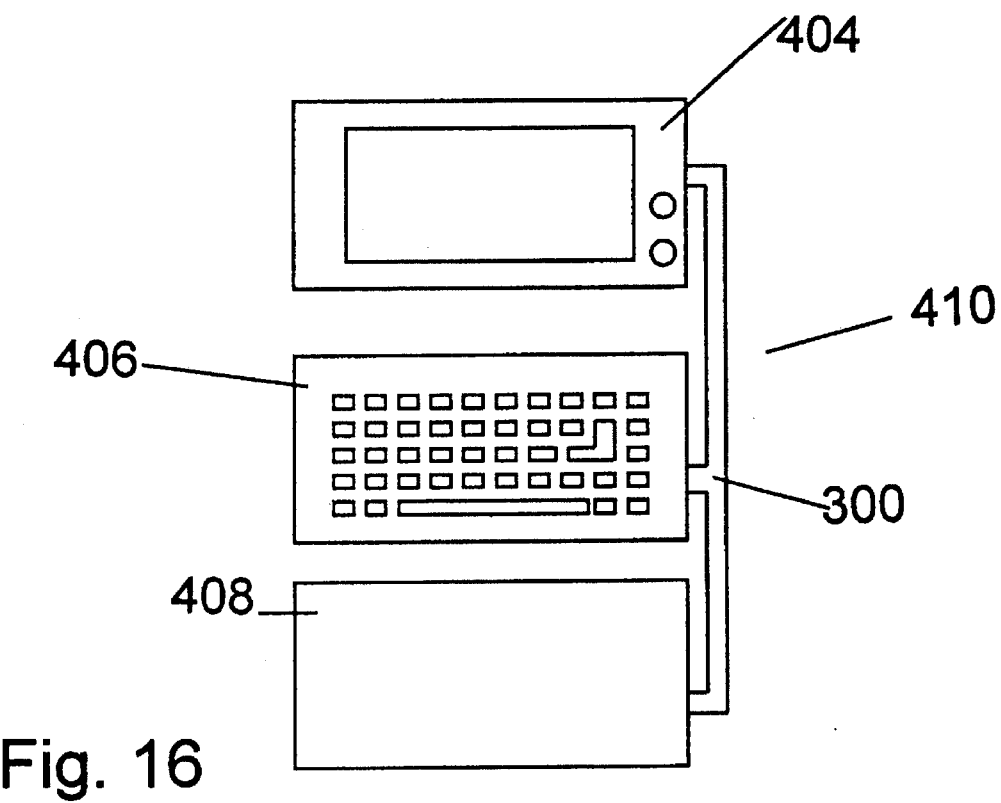
FIG. 16 is a front view of a three-part electronic device wherein the parts are interconnected by an alternative embodiment of the hinge assembly of the present invention.

Referring to FIG. 16, device parts 404, 406 and 408 are interconnected using hinge assembly 410. Referring to FIG. 8, the hinge assembly 410 has a "T" element 300 having a first segment 302, a second segment 304 and an extension 306. First segment 302 and second segment 304 of the element 300 have shape and structures substantially similar to the first segment 94 and second segment 96 of knuckle 58. The extension 306 has shape and structure substantially similar to the second portion 97 of the arm 59 having at its end disposed away from first and second segments 302 and 304 a joint end (not shown). The joint end of the extension 306 rotatably connects to the first part 404 of the electronic device, in a manner substantially as described above for the connection between the knuckle 58 and the arm 59. The first segment 302 rotatably connects to the second part 406, in a manner substantially as described above for the connection between the knuckle 58 and the neck 88 of the display part 12. The second segment 304 rotatably connects to the third part 408, in a manner substantially as described above for the connection between the knuckle 58 and the arm 59. Although, as shown, the part 404 has a display, the second part 406 has a keyboard and the part 408 has a printer, scanner and cellular phone, it is to be recognized that the hinge assemblies 400, 402 and 410 may be used with various kinds of multiple-part electronic devices, that is, whether or not displays, keyboards, printers, scanners or cellular phones are used, without departing from the principles of the invention.

In addition, it is to be understood that, while the two-part electronic device of the description is interconnected using one hinge assembly attached to corresponding sides of the two device parts, more than one hinge assembly may be used or the hinge assembly may be attached to two different sides or surfaces of the device parts without departing from the principles of the invention. For example, in a two-part electronic device, two hinge assemblies as described above may interconnect the device parts, one hinge assembly being attached to the respective right sides of the parts and the other hinge assembly being attached to the respective left sides of the parts. Although this configuration inhibits rotation about the respective rotational axes of the second segments of the knuckles and the second portions of the arms, this configuration provides robust support between the parts. Moreover, one or more of the hinge assemblies may be detachable as described above so as to allow selective rotation about a rotation axis of a second segment of a knuckle or second portion of an arm, as the case may be. In a second example, the hinge assembly may be attached to the one part along a side thereof while being attached to the other part along a centrally disposed line at or adjacent the outside surface thereof.

It is also to be understood that the hinge assembly may be constructed so as to be detachable from the parts of the electronic device without departing from the principles of the invention. Referring to FIGS. 17 and 18, a detachable embodiment of a hinge assembly 700 is shown separated from the parts of a two-part electronic device 702 to which the hinge assembly 700 may be releasably attached. The hinge assembly 700 has a first end 704 that may be releasably attached to a display part 706, and has a second end 708 that may be releasably attached to a base part 710. The first end 704 and second end 708 of the hinge assembly 700 are interconnected by an arm 716. It is to be recognized that the hinge assembly 700 is substantially the same as hinge assembly 8 hereinabove described, except the end connectors (not shown) of hinge assembly 700 attach first end 704 and second end 708 to respective first case 712 and second case 714 rather than directly to the parts of the electronic device 702.

The first end 704 and the second end 708 of the hinge assembly 700 are enclosed within respective first and second cases 712 and 714. The first case 712 and second case 714 have a plurality of attachment elements 718 extending a predetermined distance from the respective first case 712 and second case 714. Although in the embodiment shown, the attachment elements 718 are four in number and are disposed substantially at right angles from the respective first case 712 and second case 714, it is to be recognized that the attachment elements 718 may be other than four in number and may be disposed at some other angle relative to the cases 712 and 714 without departing from the principles of the invention.

The display part 706 and base part 710 have a plurality of apertures 720, equal in number to the number of attachment elements 718 of the associated first case 712 and second case 714. The apertures 720 have dimensions and shapes corresponding to the dimensions and shapes of respective attachment elements 718 so that the attachments elements 718 may be removably inserted in the apertures 720 and, thereby, releasably attach the hinge assembly 700 to the parts of the electronic device 702.

Each attachment element 718 has an indentation 722 disposed at a predetermined location along the length thereof, and each aperture 720 has a spring-loaded ball detent mechanism (not shown) disposed therein at a location along the length of the aperture 720 corresponding to the location of the indentation 722. When the attachment elements 718 are inserted in apertures 720, the spring-loaded balls of the detent mechanisms disposed within the apertures 720 seat in indentations 722 of the elements 718, so that the hinge assembly 700 may not be detached from the electronic device 702 unless so urged by the user. Such spring-loaded ball detent mechanism are well-known in the art. Although in the embodiment shown, indentations 722 and spring-loaded ball detent mechanisms are used to releasably attach the hinge assembly 700 to the electronic device 702, it is to be recognized that other structure may be used to provide such attachment without departing from the principles of the invention. For example, each attachment element 718 may have an annular notch cut at a predetermined location along its length and each aperture 720 may have a split ring spring disposed at a location along the length of the aperture 720 corresponding to the location of the annular notch of the attachment element 718, so that the split ring spring seats in the annular notch when the attachment element 718 is inserted in the aperture 720. It is also to be recognized that, although in the embodiment shown the attachment elements 718 have circular cross-sectional shapes, the attachment elements 718 may have other cross-sectional shapes without departing from the principles of the invention.

The first case 712 and second case 714 have electrical connectors 724 and the display part 706 and base part 710 have electrical connectors 726. The respective electrical connectors 724 and 726 are at corresponding locations on respective ends 704 and 708 of the hinge assembly 700 and parts 706 and 710 of the electronic device 702 so that, when the hinge assembly 700 is attached to the electronic device 702, the respective electrical connectors 724 and 726 make electrical connection. The electrical connectors 724 and 726 may be of any type well-known in the art.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. An interconnection assembly for a portable electronic computer, the computer having a first part and a second part, comprising:

a first linear track adapted to be connected to the first part of the computer;

a first carriage movably mounted on said first linear track so as to move lineally along said first linear track;

a first rotational joint member having a first axis of rotation independent of lineal movement by said first carriage along said first linear track and being adapted to be connected to said first carriage;

a second rotational joint member having a second axis of rotation and being rotatably connected to said first rotational joint member so that said first axis of rotation and said second axis of rotation are collinear and said first and second joint members rotate relative to one another about their axes of rotation;

a third rotational joint member having a third axis of rotation and being connected to said second rotational joint member so that said third axis of rotation intersects a line which is substantially perpendicular to said second axis of rotation and to said third axis of rotation; and a fourth rotational joint member adapted to be connected to the second part of the computer, said fourth rotational joint member having a fourth axis of rotation and being rotatably connected to said third rotational joint member so that said fourth axis of rotation and said third axis of rotation are collinear, and said fourth and third joint members rotate relative to one another about their axes of rotation, and that the second part of the computer and the first part of the computer can be rotated with respect to one another about two distinct axes.

2. The interconnection assembly of claim 1, further comprising:

a fifth rotational joint member having a fifth axis of rotation and being connected to said second rotational joint member so that said fifth axis of rotation intersects said second axis of rotation; and a sixth rotational joint member connected to said third rotational joint member, having a sixth axis of rotation and being rotatably connected to said fifth rotational joint member so that said sixth axis of rotation and said fifth axis of rotation are collinear and said sixth and fifth joint members rotate relative to one another about their axes of rotation, and that the second part of the computer and the first part of the computer can be rotated with respect to one another about a third distinct axis.

3. The interconnection assembly of claim 1, further comprising:

a second linear track adapted to be connected to a second part of the computer; and a second carriage movably mounted on said second linear track so as to move lineally along said second linear track, said second carriage being connected to said fourth rotational joint member, so that the second part of the computer can be moved lineally with respect to the first part of the computer on said first linear track and the first part of the computer can be moved lineally with respect to the second part of the computer on said second linear track.

4. The interconnection assembly of claim 1, wherein said interconnection assembly includes a self-releasing connector for releasably connecting the interconnection assembly to one of the first or second parts of the computer.

5. The interconnecting assembly of claim 1, wherein said first rotational joint member includes a plurality of first electrical contacts and said second rotational joint member includes a plurality of second electrical contacts corresponding to and in contact with respective first electrical contacts regardless of the relative rotational position of said first rotational joint member and said second rotational joint member, said first plurality of electrical contacts being disposed around the periphery of said first rotational joint member and said second plurality of electrical contacts being disposed on the inside of a cylindrical sleeve extending from said second rotational joint member over said first rotational joint member, so that the first pan of the computer and the second part of the computer can be rotated with respect to one another while maintaining electrical communication therebetween through said interconnection assembly.

6. An interconnection assembly for a portable electronic computer, the computer having a first part and a second part, comprising:

a first linear track adapted to be connected to the first part of the computer;

a first carriage movably mounted on said first linear track so as to move lineally along said first linear track;

a first rotational joint member having a first axis of rotation and being adapted to be connected to said first carriage;

a second rotational joint member having a second axis of rotation and being rotatably connected to said first rotational joint member so that said first axis of rotation and said second axis of rotation are collinear and said first and second joint members rotate relative to one another about their axes of rotation;

a third rotational joint member having a third axis of rotation and being connected to said second rotational joint member so that said third axis of rotation intersects said second axis of rotation and is substantially perpendicular thereto; and a fourth rotational joint member adapted to be connected to the second part of the computer, having a fourth axis of rotation and being rotatably connected to said third rotational joint member so that said fourth axis of rotation and said third axis of rotation are collinear, and said fourth and third joint members rotate relative to one another about their axes of rotation, and that the second part of the computer and the first part of the computer can be rotated with respect to one another about two distinct axes.

7. The interconnection assembly of claim 6, further comprising:

a second linear track adapted to be connected to a second part of the computer; and a second carriage movably mounted on said second linear track so as to move lineally along said second linear track, said second carriage being connected to said fourth rotational joint member, so that the second part of the computer can be moved lineally with respect to the first part of the computer on said first linear track and the first part of the computer can be moved lineally with respect to the second part of the computer on said second linear track.

8. The interconnection assembly of claim 7, further comprising:

a fifth rotational joint member having a fifth axis of rotation and being connected to said fourth rotational joint member so that said fifth axis of rotation intersects said fourth axis of rotation and is substantially perpendicular thereto; and a sixth rotational joint member being adapted to be connected to said second carriage, having a sixth axis of rotation and being rotatably connected to said fifth rotational joint member so that said sixth axis of rotation and said fifth axis of rotation are collinear and said sixth and fifth joint members rotate relative to one another about their axes of rotation, and that the second part of the computer and the first part of the computer can be rotated with respect to one another about three distinct axes.

9. The interconnection assembly of claim 6, wherein said interconnection assembly includes a self-releasing connector for releasably connecting the interconnection assembly to one of the first or second parts of the computer.

10. The interconnecting assembly of claim 6, wherein said first rotational joint member includes a plurality of first electrical contacts and said second rotational joint member includes a plurality of second electrical contacts corresponding to and in contact with respective first electrical contacts regardless of the relative rotational position of said first rotational joint member and said second rotational joint member, said first plurality of electrical contacts being disposed around the periphery of said first rotational joint member and said second plurality of electrical contacts being disposed on the inside of a cylindrical sleeve extending from said second rotational joint member over said first rotational joint member, so that the first part of the computer and the second part of the computer can be rotated with respect to one another while maintaining electrical communication therebetween through said interconnection assembly.

11. An interconnection assembly for a portable electronic computer, the computer having a first part and a second part, comprising:

a first linear track adapted to be connected to a first part of the computer;

a first carriage movably mounted on said first linear track so as to move lineally along said first linear track;

a second linear track adapted to be connected to a second part of the computer;

a second carriage movably mounted on said second linear track so as to move lineally along said second linear track;

a first rotational joint member having a first axis of rotation and being connected to said first carriage; and a second rotational joint member having a second axis of rotation and being rotatably connected to said first rotational joint member so that said first axis of rotation and said second axis of rotation are collinear and said first and second joint members rotate relative to one another about their axes of rotation, said second rotational joint member being connected to said second carriage, so that the second part of the computer can be moved lineally with respect to the first part of the computer on said first linear track, the first part of the computer can be moved lineally with respect to the second part of the computer on said second linear track, and the first part of the computer and the second part of the computer can be rotated with respect to one another.

12. The interconnection assembly of claim 11, wherein said interconnection assembly includes a self-releasing connector for releasably connecting the interconnection assembly to one of the first or second parts of the computer.

13. The interconnecting assembly of claim 11, wherein said first rotational joint member includes a plurality of first electrical contacts and said second rotational joint member includes a plurality of second electrical contacts corresponding to and in contact with respective first electrical contacts regardless of the relative rotational position of said first rotational joint member and said second rotational joint member, said first plurality of electrical contacts being disposed around the periphery of said first rotational joint member and said second plurality of electrical contacts being disposed on the inside of a cylindrical sleeve extending from said second rotational joint member over said first rotational joint member, so that the first part of the computer and the second part of the computer can be rotated with respect to one another while maintaining electrical communication therebetween through said interconnection assembly.

14. An interconnection assembly for a portable electronic computer, the computer having a first part and a second part, comprising:

a first rotational joint member having a first axis of rotation and being adapted to be connected to the first part of the computer;

a second rotational joint member being adapted to be connected to the second part of the computer, having a second axis of rotation and being rotatably connected to said first rotational joint member so that said first axis of rotation and said second axis of rotation are collinear and said first and second joint members rotate relative to one another about their axes of rotation; and a self releasing connector which is separable from said first part and said second part of said computer for releasably connecting said first rotational joint member to the first part of the computer, so that the second part of the computer and the first part of the computer can be rotated with respect to one another yet may be disconnected from one another without the aid of tools.

15. An interconnection assembly for a portable electronic computer, the computer having a first part and a second part, comprising:

a first rotational joint member having a first axis of rotation and being adapted to be connected to the first part of the computer;

a second rotational joint member being adapted to be connected to the second part of the computer, having a second axis of rotation and being rotatably connected to said first rotational joint member so that said first axis of rotation and said second axis of rotation are collinear and said first and second joint members rotate relative to one another about their axes of rotation; and said first rotational joint member including a plurality of first electrical contacts and said second rotational joint member including a plurality of second electrical contacts corresponding to and in contact with respective first electrical contacts regardless of the relative rotational position of said first rotational joint member and said second rotational joint member, said plurality of said first electrical contacts being disposed around the periphery of said first rotational joint member and said plurality of said second electrical contacts being disposed on the inside of a cylindrical sleeve extending from said second rotational joint member over said first rotational joint member, so that the first part of the computer and the second part of the computer can be rotated with respect to one another while maintaining electrical communication therebetween through said interconnection assembly, wherein said plurality of said first electrical contacts and said plurality of said second electrical contacts and said cylindrical sleeve are separable from said first rotational joint member.

16. An interconnection assembly for a portable electronic computer, the computer having a first part and a second part, comprising:

a first linear track adapted to be connected to the first part of the computer;

a first carriage movably mounted on said first linear track so as to move lineally along said first linear track a first rotational joint member having a first axis of rotation and a second rotational joint member;

said second rotational joint member having a second axis of rotation and being rotatably connected to said first rotational joint member so that said first axis of rotation and said second axis of rotation are collinear and said first and second joint members rotate relative to one another about their axes of rotation, said second rotational joint member being connected to said first carriage independent of said first rotational joint member and said first linear track, so that the second part of the computer can be moved lineally with respect to the first part of the computer on said first linear track and the first part of the computer and the second part of the computer can be rotated with respect to one another; and said first rotational joint member being adapted to be connected to a second part of the computer.

17. The interconnection assembly of claim 16, wherein said interconnection assembly includes a self-releasing connector for releasably connecting the interconnection assembly to one of the first or second parts of the computer.

18. The interconnecting assembly of claim 16, wherein said first rotational joint member includes a plurality of first electrical contacts and said second rotational joint member includes a plurality of second electrical contacts corresponding to and in contact with respective first electrical contacts regardless of the relative rotational position of said first rotational joint member and said second rotational joint member, said first plurality of electrical contacts being disposed around the periphery of said first rotational joint member and said second plurality of electrical contacts being disposed on the inside of a cylindrical sleeve extending from said second rotational joint member over said first rotational joint member, so that the first part of the computer and the second part of the computer can be rotated with respect to one another while maintaining electrical communication therebetween through said interconnection assembly.

19. An interconnection assembly for a portable electronic computer, the computer having a first part and a second part, comprising:

a first rotational joint member having a first axis of rotation and being adapted to be connected to the first part of the computer;

a second rotational joint member having a second axis of rotation and being rotatably connected to said first rotational joint member so that said first axis of rotation and said second axis of rotation are collinear and said first and second joint members rotate relative to one another about their axes of rotation;

a third rotational joint member having a third axis of rotation and being connected to said second rotational joint member so that said third axis of rotation intersects a line which is substantially perpendicular to said second axis of rotation and to said third axis of rotation; and a fourth rotational joint member being adapted to be connected to the second part of the computer, having a fourth axis of rotation and being rotatably connected to said third rotational joint member so that said fourth axis of rotation and said third axis of rotation are collinear, said fourth and third joint members rotate relative to one another about their axes of rotation, so that the second part of the computer and the first part of the computer can be rotated independently with respect to one another about two distinct axes.

20. The interconnection assembly of claim 19, wherein said interconnection assembly includes a self-releasing connector for releasably connecting the interconnection assembly to one of the first or second parts of the computer.

21. The interconnecting assembly of claim 19, wherein said first rotational joint member includes a plurality of first electrical contacts and said second rotational joint member includes a plurality of second electrical contacts corresponding to and in contact with respective first electrical contacts regardless of the relative rotational position of said first rotational joint member and said second rotational joint member, said first plurality of electrical contacts being disposed around the periphery of said first rotational joint member and said second plurality of electrical contacts being disposed on the inside of a cylindrical sleeve extending from said second rotational joint member over said first rotational joint member, so that the first part of the computer and the second part of the computer can be rotated with respect to one another while maintaining electrical communication therebetween through said interconnection assembly.

22. An interconnection assembly for a portable electronic computer, the computer having a first part and a second part, comprising:

a first rotational joint member having a first axis of rotation and being adapted to be connected to the first part of the computer;

a second rotational joint member having a second axis of rotation and being rotatably connected to said first rotational joint member so that said first axis of rotation and said second axis of rotation are collinear and said first and second joint members rotate relative to one another about their axes of rotation;

a third rotational joint member having a third axis of rotation and being connected to said second rotational joint member so that said third axis of rotation intersects said second axis of rotation and is substantially perpendicular thereto;

a fourth rotational joint member having a fourth axis of rotation and being rotatably connected to said third rotational joint member so that said fourth axis of rotation and said third axis of rotation are collinear, and said fourth and third joint members rotate relative to one another about their axes of rotation;

a fifth rotational joint member having a fifth axis of rotation and being connected to said fourth rotational joint member so that said fifth axis of rotation intersects said fourth axis of rotation and is substantially perpendicular thereto; and a sixth rotational joint member being adapted to be connected to the second part of the computer, having a sixth axis of rotation and being rotatably connected to said fifth rotational joint member so that said sixth axis of rotation and said fifth axis of rotation are collinear and said sixth and fifth joint members rotate relative to one another about their axes of rotation and that the second part of the computer and the first part of the computer can be rotated with respect to one another about three distinct axes.

23. The interconnection assembly of claim 22, wherein said interconnection assembly includes a self-releasing connector for releasably connecting the interconnection assembly to one of the first or second parts of the computer.

24. The interconnecting assembly of claim 22, wherein said first rotational joint member includes a plurality of first electrical contacts and said second rotational joint member includes a plurality of second electrical contacts corresponding to and in contact with respective first electrical contacts regardless of the relative rotational position of said first rotational joint member and said second rotational joint member, said first plurality of electrical contacts being disposed around the periphery of said first rotational joint member and said second plurality of electrical contacts being disposed on the inside of a cylindrical sleeve extending from said second rotational joint member over said first rotational joint member, so that the first part of the computer and the second part of the computer can be rotated with respect to one another while maintaining electrical communication therebetween through said interconnection assembly.

25. An interconnection assembly for a portable electronic computer, the computer having a first part and a second part, comprising:

a first rotational joint member having a first axis of rotation and being adapted to be connected to the first part of the computer;

a second rotational joint member having a second axis of rotation and being rotatably connected to said first rotational joint member so that said first axis of rotation and said second axis of rotation are collinear and said first and second joint members rotate relative to one another about their axes of rotation;

a third rotational joint member having a third axis of rotation and being connected to said second rotational joint member so that said third axis of rotation intersects said second axis of rotation and is substantially perpendicular thereto; and a fourth rotational joint member being adapted to be connected to the second part of the computer, having a fourth axis of rotation and being rotatably connected to said third rotational joint member so that said fourth axis of rotation and said third axis of rotation are collinear, at least one of said first and second and one of said third and fourth rotational joint members being elongate, and said fourth and third joint members rotate relative to one another about their axes of rotation, so that the second part of the computer and the first part of the computer can be rotated with respect to one another about two distinct axes.

26. The interconnection assembly of claim 25, wherein said interconnection assembly includes a self-releasing connector for releasably connecting the interconnection assembly to one of the first or second parts of the computer.

27. The interconnecting assembly of claim 25, wherein said first rotational joint member includes a plurality of first electrical contacts and said second rotational joint member includes a plurality of second electrical contacts corresponding to and in contact with respective first electrical contacts regardless of the relative rotational position of said first rotational joint member and said second rotational joint member, said first plurality of electrical contacts being disposed around the periphery of said first rotational joint member and said second plurality of electrical contacts being disposed on the inside of a cylindrical sleeve extending from said second rotational joint member over said first rotational joint member, so that the first part of the computer and the second part of the computer can be rotated with respect to one another while maintaining electrical communication therebetween through said interconnection assembly.

28. An electro-rotational connector, having one or more inputs and one or more outputs, comprising:

at least one pair of conducting washers aligned next to one another along a longitudinal axis, one of said conducting washers being in electrical connection with one of the inputs and the other of said conducting washers being in electrical connection with one of the outputs, each of said conducting washers of said pair being adapted to rotate relative to the other of said conducting washers, and each of said conducting washers having a conducting face; and said conducting faces being disposed flat against and in electrical contact with each other regardless of the rotation of the conducting washers relative to each other, so that an electrical signal present on one of said conducting faces is communicated to the other of said conducting faces in maintaining electrical connection between said input and said output regardless of the relative rotational positions of said washers.

* * * * *